(12) United States Patent
Sun et al.

(10) Patent No.: US 6,991,526 B2
(45) Date of Patent: Jan. 31, 2006

(54) CONTROL OF REMOVAL PROFILE IN ELECTROCHEMICALLY ASSISTED CMP

(75) Inventors: Lizhong Sun, San Jose, CA (US); Liang-Yuh Chen, Foster City, CA (US); Siew Neo, Santa Clara, CA (US); Feng Q. Liu, San Jose, CA (US); Alain Duboust, Sunnyvale, CA (US); Stan D. Tsai, Fremont, CA (US); Rashid Mavliev, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/244,697

(22) Filed: Sep. 16, 2002

(65) Prior Publication Data

US 2004/0053560 A1 Mar. 18, 2004

(51) Int. Cl.
*B24B 1/00* (2006.01)
*C25F 7/00* (2006.01)

(52) U.S. Cl. .................. 451/104; 451/36; 451/285; 204/212; 204/224 M; 204/230.2

(58) Field of Classification Search .............. 451/36, 451/37, 41, 54, 57, 60, 63, 527, 529, 526, 451/285–287; 205/84, 157, 653, 654, 661–663, 205/667; 204/224 R, 224 M, 212, 242, 230.2, 204/275.1, 269, 272, 229.4
See application file for complete search history.

(56) References Cited

U.S. PATENT DOCUMENTS

| | | | |
|---|---|---|---|
| 3,162,588 A | 12/1964 | Bell | |
| 3,448,023 A | 6/1969 | Bell | |
| 3,873,512 A | 3/1975 | Latanision | |
| 4,125,444 A | 11/1978 | Inoue | |
| 4,713,149 A | 12/1987 | Hoshino | |
| 4,793,895 A | 12/1988 | Kaanta et al. | |
| 4,839,005 A * | 6/1989 | Katsumoto et al. | ......... 205/663 |
| 4,839,993 A | 6/1989 | Masuko et al. | |
| 4,934,102 A | 6/1990 | Leach et al. | |
| 4,954,141 A | 9/1990 | Takiyama et al. | |
| 4,956,056 A | 9/1990 | Zubatova et al. | |
| 5,096,550 A | 3/1992 | Mayer et al. | |

(Continued)

FOREIGN PATENT DOCUMENTS

DE 3413762 A1 5/1983

(Continued)

OTHER PUBLICATIONS

U.S. Appl. No. 10/038,066.

(Continued)

*Primary Examiner*—Hadi Shakeir
(74) *Attorney, Agent, or Firm*—Fish & Richardson

(57) ABSTRACT

Aspects of the invention generally provide a method and apparatus for polishing a substrate using electrochemical deposition techniques. In one aspect, an apparatus for polishing a substrate comprises a counter-electrode and a pad positioned between a substrate and the counter-electrode and a pad positioned between a substrate and the counter-electrode. A dielectric insert is positioned between the counter-electrode and the substrate. The dielectric insert has a plurality of zones, each zone permitting a separate current density between the counter-electrode and the substrate. In another embodiment, an apparatus for polishing a substrate that include a conductive layer comprises a counter-electrode to the material layer. The counter-electrode comprises a plurality of electrically isolated conductive elements. An electrical connector is separately coupled to each of the conductive elements.

14 Claims, 13 Drawing Sheets

U.S. PATENT DOCUMENTS

| | | | |
|---|---|---|---|
| 5,136,817 A | 8/1992 | Tabata et al. | |
| 5,217,586 A | 6/1993 | Datta et al. | |
| 5,225,034 A | 7/1993 | Yu et al. | |
| 5,534,106 A | 7/1996 | Cote et al. | |
| 5,543,032 A | 8/1996 | Datta et al. | |
| 5,567,300 A | 10/1996 | Datta et al. | |
| 5,575,706 A | 11/1996 | Tsai et al. | |
| 5,578,362 A | 11/1996 | Reinhardt et al. | |
| 5,624,300 A | 4/1997 | Kishii et al. | |
| 5,637,031 A * | 6/1997 | Chen | 451/41 |
| 5,738,574 A | 4/1998 | Tolles et al. | |
| 5,766,446 A | 6/1998 | Spindt et al. | |
| 5,804,507 A | 9/1998 | Perlov et al. | |
| 5,807,165 A | 9/1998 | Uzoh et al. | |
| 5,846,882 A | 12/1998 | Birang | |
| 5,871,392 A | 2/1999 | Meikle et al. | |
| 5,893,796 A | 4/1999 | Birang et al. | |
| 5,911,619 A | 6/1999 | Uzoh et al. | |
| 5,931,719 A | 8/1999 | Nagahara et al. | |
| 5,938,801 A | 8/1999 | Robinson | |
| 5,966,151 A | 10/1999 | Wakahara | |
| 6,001,008 A | 12/1999 | Fujimori et al. | |
| 6,004,880 A | 12/1999 | Liu et al. | |
| 6,010,395 A | 1/2000 | Nakajima | |
| 6,017,265 A | 1/2000 | Cook et al. | |
| 6,020,264 A | 2/2000 | Lustig et al. | |
| 6,024,630 A | 2/2000 | Shendon et al. | |
| 6,051,116 A | 4/2000 | Ichinose et al. | |
| 6,056,851 A | 5/2000 | Hsieh et al. | |
| 6,066,030 A | 5/2000 | Uzoh | |
| 6,068,818 A | 5/2000 | Ackley et al. | |
| 6,090,239 A | 7/2000 | Liu et al. | |
| 6,103,096 A | 8/2000 | Datta et al. | |
| 6,116,998 A | 9/2000 | Damgaard et al. | |
| 6,141,027 A | 10/2000 | Akutsu et al. | |
| 6,153,043 A | 11/2000 | Edelstein et al. | |
| 6,156,124 A | 12/2000 | Tobin | |
| 6,159,079 A | 12/2000 | Zuniga et al. | |
| 6,171,467 B1 | 1/2001 | Weihs et al. | |
| 6,176,992 B1 | 1/2001 | Talieh | |
| 6,210,257 B1 | 4/2001 | Carlson | |
| 6,234,870 B1 | 5/2001 | Uzoh et al. | |
| 6,238,271 B1 | 5/2001 | Cesna | |
| 6,244,935 B1 | 6/2001 | Birang et al. | |
| 6,248,222 B1 | 6/2001 | Wang | |
| 6,273,798 B1 | 8/2001 | Berman | |
| 6,297,159 B1 | 10/2001 | Paton | |
| 6,328,872 B1 | 12/2001 | Talieh et al. | |
| 6,358,118 B1 | 3/2002 | Boehm et al. | |
| 6,368,184 B1 | 4/2002 | Beckage | |
| 6,368,190 B1 | 4/2002 | Easter et al. | |
| 6,379,223 B1 | 4/2002 | Sun et al. | |
| 6,381,169 B1 | 4/2002 | Bocian et al. | |
| 6,386,956 B1 | 5/2002 | Sato et al. | |
| 6,391,166 B1 | 5/2002 | Wang | |
| 6,395,152 B1 | 5/2002 | Wang | |
| 6,402,591 B1 | 6/2002 | Thornton | |
| 6,406,363 B1 | 6/2002 | Xu et al. | |
| 6,409,904 B1 | 6/2002 | Uzoh et al. | |
| 6,413,388 B1 | 7/2002 | Uzoh et al. | |
| 6,413,403 B1 | 7/2002 | Lindquist et al. | |
| 6,440,295 B1 | 8/2002 | Wang | |
| 6,447,668 B1 | 9/2002 | Wang | |
| 6,471,847 B2 | 10/2002 | Talieh et al. | |
| 6,482,307 B2 * | 11/2002 | Ashjaee et al. | 205/103 |
| 6,497,800 B1 | 12/2002 | Talieh et al. | |
| 6,582,281 B2 | 6/2003 | Doan et al. | |
| 6,612,904 B1 | 9/2003 | Boehm et al. | |
| 6,620,336 B2 * | 9/2003 | Nakamura | 451/66 |
| 6,630,059 B1 | 10/2003 | Uzoh et al. | |
| 6,638,863 B2 | 10/2003 | Wang et al. | |
| 6,726,823 B1 | 4/2004 | Wang et al. | |
| 6,739,951 B2 * | 5/2004 | Sun et al. | 451/41 |
| 6,776,693 B2 | 8/2004 | Duboust et al. | |
| 2001/0005667 A1 | 6/2001 | Tolles et al. | |
| 2001/0024878 A1 | 9/2001 | Nakamura | |
| 2001/0027018 A1 | 10/2001 | Molnar | |
| 2001/0035354 A1 | 11/2001 | Ashjaee et al. | |
| 2001/0036746 A1 | 11/2001 | Sato et al. | |
| 2001/0040100 A1 | 11/2001 | Wang | |
| 2001/0042690 A1 | 11/2001 | Talieh | |
| 2002/0008036 A1 | 1/2002 | Wang | |
| 2002/0011417 A1 | 1/2002 | Talieh et al. | |
| 2002/0020621 A1 | 2/2002 | Uzoh et al. | |
| 2002/0025760 A1 | 2/2002 | Lee | |
| 2002/0025763 A1 | 2/2002 | Lee | |
| 2002/0070126 A1 | 6/2002 | Sato | |
| 2002/0077037 A1 | 6/2002 | Tietz | |
| 2002/0088715 A1 | 7/2002 | Talieh et al. | |
| 2002/0108861 A1 | 8/2002 | Emesh | |
| 2002/0119286 A1 | 8/2002 | Chen et al. | |
| 2002/0130049 A1 | 9/2002 | Chen et al. | |
| 2003/0104762 A1 | 6/2003 | Sato et al. | |
| 2003/0114087 A1 | 6/2003 | Duboust et al. | |
| 2003/0116445 A1 | 6/2003 | Sun et al. | |
| 2003/0116446 A1 | 6/2003 | Duboust et al. | |
| 2003/0129927 A1 * | 7/2003 | Lee et al. | 451/41 |
| 2003/0213703 A1 | 11/2003 | Wang et al. | |
| 2004/0023610 A1 | 2/2004 | Hu et al. | |

FOREIGN PATENT DOCUMENTS

| | | |
|---|---|---|
| EP | 0 325 753 | 8/1989 |
| EP | 0 455 455 | 4/1991 |
| EP | 1 103 346 A2 | 5/2001 |
| GB | 2 214 520 A | 9/1989 |
| JP | 10-16213 | 1/1998 |
| JP | 2870537 | 1/1999 |
| JP | 11042554 | 2/1999 |
| JP | 2000-218513 | 8/2000 |
| JP | 2001-77117 | 3/2001 |
| JP | 2001-244223 | 9/2001 |
| WO | WO 98/49723 | 11/1998 |
| WO | WO 99/41434 | 8/1999 |
| WO | WO 99/53119 | 10/1999 |
| WO | WO 00/03426 | 1/2000 |
| WO | WO 00/26443 | 5/2000 |
| WO | WO 04/024394 | 5/2000 |
| WO | WO 00/33356 | 6/2000 |
| WO | WO 00/59682 | 10/2000 |
| WO | WO-2001-13416 | 2/2001 |
| WO | WO 01/49452 | 7/2001 |
| WO | WO-2001-52307 | 7/2001 |
| WO | WO-2001-63018 | 8/2001 |
| WO | WO-2001-71066 | 9/2001 |
| WO | WO 01/88229 | 11/2001 |
| WO | WO-2001-88954 | 11/2001 |
| WO | WO 02/23616 | 3/2002 |
| WO | WO 02/064314 | 8/2002 |
| WO | WO 03/001581 A2 | 1/2003 |
| WO | WO 03/061905 A1 | 7/2003 |

OTHER PUBLICATIONS

U.S. Appl. No. 10/033,732.
U.S. Appl. No. 10/032,275.
U.S. Appl. No. 10/163,796.
U.S. Appl. No. 10/151,538.
U.S. Appl. No. 10/141,459.
Nogami, "An Innovation in Integrate Porous Low-K Materials and Copper," *InterConnect Japan 2001*; Honeywell Seminar Dec. 6, 2001, p 1-12.
PCT International Search Report for PCT/US03/29230, dated Feb. 3, 2004.

PCT Written Opinion for PCT/US03/01760 dated Mar. 8, 2004.
PCT International Search Report for PCT/US03/01760 dated May 27, 2003.
Contolini, et al. "Electrochemical Planarization of ULSI Copper" Solid State Technology pp. 1-7.
International Search Report for PCT/US 02/11009 dated Feb. 6, 2003.
PCT International Search Report dated Mar. 30, 2005 for PCT/US2004/007501.
PCT Written Opinion dated Mar. 30, 2005 for PCT/US2004/007501.
Alexander, et al., "Electrically Conductive Polymer Nanocomposite Materials," www.afrlhorizon.com/Briefs/Sept02/ML0206.html, Date Unknown.
PCT International Preliminary Examination Report for PCT/US03/06058, dated Sep. 7, 2004.
PCT International Search Report for US 02/04806 dated Apr. 1, 2003.
PCT International Search Report for US 03/06058 dated Jun. 25, 2003.
PCT Written Opinion for PCT/US02/04806, dated Mar. 9, 2004.
PCT Written Opinion for PCT/US03/06058, dated Feb. 13, 2004.
D. Landolt, "Fundamental Aspects of Electropolishing", Mar. 18, 1996, pp. 1-11.
Partial International Search Report for US 02/40754 dated Apr. 28, 2003.
PCT International Preliminary Examination Report for PCT/US02/04806, dated Sep. 7, 2004.
PCT Invitation to Pay Additional Fees for PCT/US04/006385 dated Mar. 22, 2005.
PCT International Search Report for PCT/US04/006385 dated May 17, 2005.
PCT Written Opinion for PCT/US04/006385 dated May 17, 2005.

* cited by examiner

CONTROL OF REMOVAL PROFILE IN ELECTROCHEMICALLY ASSISTED CMP

CROSS-REFERENCE TO RELATED APPLICATIONS

This application is related to co-pending application Ser. No. 10/244,688, filed Sep. 16, 2002, entitled "Process Control In Electrochemically Assisted Planarization," commonly assigned with the present invention and herein incorporated by reference to the extent not inconsistent with the claims aspects and description herein.

BACKGROUND OF THE INVENTION

1. Field of the Invention

Embodiments of the present invention relate to a method and apparatus for planarizing a surface and, more particularly, to a method for controlling the removal or polishing profile in electrochemically assisted chemical mechanical polishing (CMP).

2. Background of the Related Art

Sub-quarter micron multi-level metallization is one of the key technologies for the next generation of ultra large-scale integration (ULSI). The multilevel interconnects that lie at the heart of this technology require planarization of interconnect features formed in high aspect ratio apertures, including contacts, vias, lines and other features. Reliable formation of these interconnect features is very important to the success of ULSI and to the continued effort to increase circuit density and quality on individual substrates and die.

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the substrate may become non-planar across its surface and require planarization. "Planarizing" a surface, or "polishing" a surface, is a process where material is removed from the surface of the substrate to form a generally even, planar surface. Planarization is useful in removing undesired surface topography and surface defects, such as agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical polishing (CMP) is a common technique used to planarize substrates. CMP utilizes a chemical composition, typically a slurry or other fluid medium, for selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. The CMP apparatus effects polishing or rubbing movement between the surface of the substrate and the polishing pad while dispersing a polishing composition to effect chemical activity and/or mechanical activity and consequential removal of material from the surface of the substrate.

One material increasingly utilized in integrated circuit fabrication is copper due to its desirable electrical properties. However, copper has its own special fabrication problems. Copper material is removed at different removal rates along the different surface topography of the substrate surface, which makes effective removal of copper material from the substrate surface and planarity of the substrate surface difficult to achieve.

One solution for polishing copper is by polishing copper by electrochemical mechanical polishing (ECMP) techniques. ECMP techniques remove conductive material from a substrate surface by electrochemical dissolution while concurrently polishing the substrate with reduced mechanical abrasion compared to conventional CMP processes. The electrochemical dissolution is performed by applying an electrical bias between an electrode and a substrate surface to remove conductive materials from a substrate surface into a surrounding electrolyte. During electrochemical dissolution, the substrate typically is placed in motion relative to a polishing pad to enhance the removal of material from the surface of the substrate. In one embodiment of an ECMP system, the electrical bias is applied by a ring of conductive contacts in electrical communication with the substrate surface in a substrate support device, such as a substrate carrier head. In other ECMP systems, a bias is applied between an electrode and conductive pad that is in contact with the substrate surface. Unfortunately, these conventional ECMP systems fail to provide a method for adjusting and controlling the polishing profile across the surface of the substrate to be polished during the ECMP process.

As a result, there is a need for a method and apparatus for controlling the polishing profile (i.e., polishing rate) during ECMP.

SUMMARY OF THE INVENTION

Aspects of the invention generally provide a method and apparatus for polishing a layer on a substrate using electrochemical deposition techniques, electrochemical dissolution techniques, polishing techniques, and/or combinations thereof. In one aspect, an apparatus for depositing or removing material from a substrate, comprises a counter-electrode and a pad having a substrate-contacting surface positioned between a substrate and the counter-electrode. A dielectric insert is positioned between the counter electrode and the substrate. The dielectric insert may be positioned proximate or in contact with the pad. The dielectric insert has a plurality of zones, each zone permitting a separate current density between the counter-electrode and the substrate. The zones of the dielectric insert may be switched between various states of permeability using, for example, retractable or sliding plates, removable annular segments or other mechanical approaches. Control and regulation of the zones of the dielectric insert may be performed by a microprocessor controller.

In one aspect, an apparatus is provided for processing a substrate including a substrate support, a counter-electrode, a pad positioned between the substrate support and the counter-electrode, wherein the pad comprises a surface for contacting a substrate, and a dielectric insert positioned between the counter electrode and the pad, wherein the dielectric insert comprises a plurality of zones and at least one zone of the plurality of zones is adapted to provide an adjustable current density between the counter-electrode and the substrate for the at least one zone of the plurality of zones.

In another aspect, an apparatus for processing a substrate, including a conductive layer including a substrate support, an electrode, and a pad positioned between the substrate support and the electrode, wherein the pad includes a plurality of zones adapted to provide an adjustable current density between the electrode and a substrate disposed on the substrate support for the at least one zone of the plurality of zones.

In another aspect, a method of processing a substrate is provided including applying a bias between an electrode and the substrate, flowing an electrolyte between the electrode and substrate, and varying the current density through one or more zones of a dielectric insert positioned between the electrode and the substrate.

In another aspect, an apparatus is provided for polishing a substrate comprising a counter-electrode and a pad positioned between the substrate and the counter-electrode. The pad comprises a plurality of reference electrodes. Separate biases may be applied between each reference electrode and the substrate.

In another aspect of the invention, a conductive pad is provided for polishing a substrate comprising a dielectric pad body, a plurality of channels are formed through a thickness of the pad body, a plurality of reference electrodes formed within the pad body permit the application of separate biases across the pad body. The pad configuration is useful for controlling the removal rates of material from various regions of a substrate in contact with or proximate to the pad.

In another aspect of the invention, a method is provided for polishing a substrate including a conductive layer comprising applying a bias between an electrode and the substrate to separately alter the current density through one or more zones of a dielectric insert positioned between the electrode and the substrate in order to control the polishing rate of the substrate.

In another aspect of the invention, a method is provided for polishing a substrate including a conductive layer comprising separately applying a plurality of biases between the conductive layer and a plurality of zones of an electrode, such as a counter-electrode.

In another aspect of the invention, a method is provided for polishing a substrate including a conductive layer comprising contacting the substrate with a polishing pad. The polishing pad includes a first reference electrode and a second reference electrode. The method comprises applying a first bias between the first reference electrode and the conductive layer. A first bias is applied between the first reference electrode and the substrate. A second bias is applied between the second reference electrode and the substrate. The second bias may be applied during the application of the first bias.

In another aspect of the invention, a method is provided for polishing comprising providing a polishing pad having a plurality of perforations formed therethrough, wherein the perforations are distributed across a plurality of zones of the pad. The distribution of the perforations in at least one zone of the polishing pad is altered in order to effectuate a change in a polishing rate of the substrate.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The words and phrases used herein should be given their ordinary and customary meaning in the art by one skilled in the art unless otherwise further defined herein. Chemical-mechanical polishing should be broadly construed and includes, but is not limited to, abrading a substrate surface by chemical activity, mechanical activity, or a combination of both chemical and mechanical activity. Electropolishing should be broadly construed and includes, but is not limited to, planarizing a substrate by the application of electro-chemical activity. Electrochemical mechanical polishing (ECMP) should be broadly construed and includes, but is not limited to, planarizing a substrate by the application of electrochemical activity, or a combination of both electro-chemical and mechanical activity to remove material from a substrate surface. Electrochemical mechanical plating process (ECMPP) should be broadly construed and includes, but is not limited to, electrochemically depositing material on a substrate and concurrently planarizing the deposited material by the application of electrochemical activity, or a combination of both electrochemical and mechanical activity.

Anodic dissolution should be broadly construed and includes, but is not limited to, the application of an anodic bias to a substrate directly or indirectly which results in the removal of conductive material from a substrate surface and into a surrounding electrolyte solution. Aperture should be broadly construed and includes, but is not limited to, a perforation, hole, opening, groove, channel, or passage formed partially or completely through an object. Additionally, the term substantially as used to modifying the term planar is intended to describe a surface on a macroscopic or global level and not surface roughness.

Figure 1A:
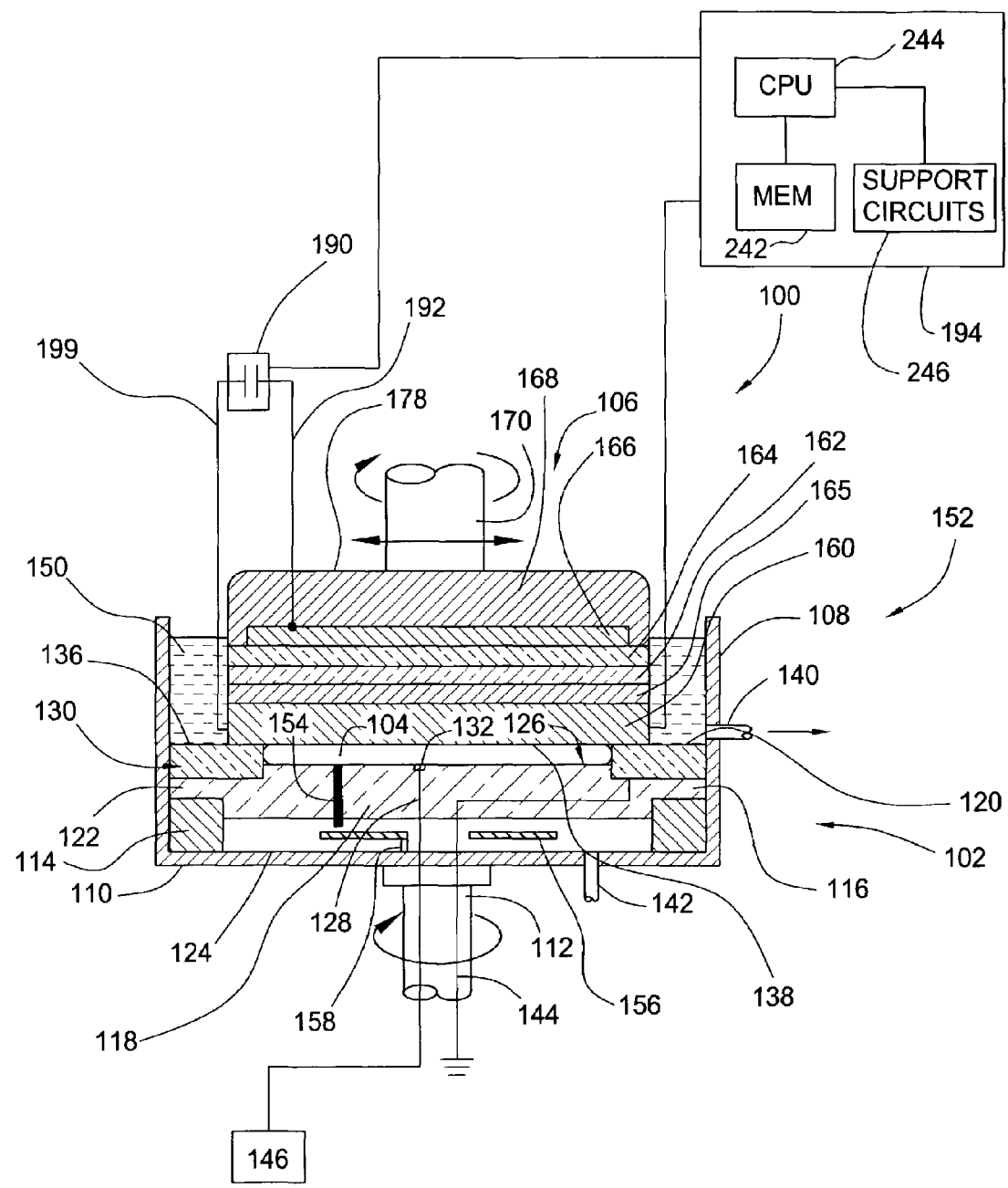
FIG. 1A is a sectional view of one embodiment of a processing cell that may be used to practice aspects described herein.

FIG. 1A depicts a sectional view of one embodiment of a process cell 100 in which at least one or more processes including plating and polishing, or combinations thereof may be practiced. The process cell 100 may be used to practice electrochemical mechanical polishing (ECMP). The process cell 100 may be used to polish a substrate that includes a conductive layer, such as a conductive layer formed on a wafer substrate, through an anodic dissolution process. In an anodic dissolution process, an anodic bias is applied to the substrate, directly or indirectly, resulting in removal of conductive material from a substrate surface into a surrounding electrolyte. The process cell 100 may also be used to electrochemically deposit material onto a substrate. The electrochemical deposition may be concurrent with the application of various forms of activity used to polish the substrate. The concurrent activity may be electrochemical activity, mechanical activity, or a combination of both electrochemical and mechanical activity, such as are used in an electrochemical mechanical plating process (ECMPP).

The process cell 100 generally includes a basin assembly 152 and a polishing head 106. A substrate 104 may be retained in the basin assembly 152 during processing in a face-up (e.g., backside down) orientation. An electrolyte is flowed over a feature side (surface) 138 of the substrate 104 during processing. The polishing head 106 is placed in contact with the substrate 104, and the polishing head 106 and the substrate are moved relative to each other to provide a polishing motion. The polishing motion generally comprises at least one motion defined by an orbital, rotary, linear or curvilinear motion, or combinations thereof, among other motions. The polishing motion may be achieved by moving either or both of the polishing head 106 and the basin assembly 152.

The basin assembly 152 generally includes a basin 102 having a substrate support or carrier 116 disposed therein. The carrier 116 generally supports the substrate 104 within the basin 102 during processing. The basin 102 is generally non-electrically conductive and can be a bowl shaped member made of a plastic such as fluoropolymers, TEFLON® polymers, perfluoroalkoxy resin, PFA, polyethylene-based plastics, PE, sulfonated polyphenylether sulfones, PES, or other materials that are compatible or non-reactive with electrolyte compositions that may be used in electroplating or electropolishing. The basin 102 generally includes sidewalls 108 and a bottom 110 that generally defines a container or electrolyte cell in which a conductive fluid such as the electrolyte can be confined. The bottom 110 generally includes a drain 142 to facilitate removal of fluids from the bottom of the basin 102, while the sidewalls 108 generally include an outlet 140 to facilitate removal of excess electrolyte from the basin 102 during processing.

The basin 102 may be stationary or be driven to provide at least a portion of a relative motion between the substrate 104 and the polishing head 106. In the embodiment depicted in FIG. 1A, an optional shaft 112 is coupled to the bottom 110 of the basin 102 and is coupled to a drive system (not shown) to provide the basin 102 with a rotary, orbital, sweep motion or a motion comprising combinations thereof, among other motions. The shaft 112 additionally provides a conduit for ground leads 144 and other control or supply lines to be routed into or out of the basin 102. In embodiments wherein the basin 102 is rotated by the shaft 112, the drain 142 may also be routed through the shaft 112.

A spacer 114 is disposed on the bottom 110 of the basin 102. The spacer 114 is typically annular in form and is comprised of a material compatible with process chemistries. In one embodiment, the spacer 114 is fabricated from the same material as the basin 102. The spacer 114 may optionally be fabricated with the basin 102 as a single member from a unitary mass of material.

The carrier 116 is generally disposed in the basin 102 and supported by the spacer 114. The carrier 116 is typically fabricated from a dielectric material such as a polymer or a ceramic material. The carrier 116 generally includes a first side 118 and a second side 120. The first side 118 includes a flange 122 substantially circumscribing a projecting center section 124. The flange 122 is disposed on the spacer 114 and supports the carrier 116 above the bottom 110 of the basin 102. The center section 124 projects into the open area defined within the spacer 114 to locate the carrier 116 within the basin 102 and prevent movement of the carrier 116 during processing.

The second side 120 of the carrier 116 includes a projecting support surface 126 that extends towards the top of the basin 102. The support surface 126 generally supports the substrate 104 during processing. The support surface 126 includes at least one vacuum port 132 formed therein and coupled to a vacuum passage 128 disposed through the carrier 116. The vacuum passage 128 is fluidly coupled through the shaft 112 to a vacuum source 146. Vacuum, drawn through the vacuum port 132, retains the substrate 104 on the support surface 126 during processing. Optionally, the support surface 126 may include topography that enhances the distribution of vacuum between the substrate 104 and support surface 126 so that the substrate 104 is uniformly pulled towards the carrier 116.

A plurality of lift pins 154 (only one is shown for clarity) is disposed through respective holes formed through the carrier 116. A lift plate 156 disposed between the carrier 116 and the chamber bottom 110 is coupled to an actuator rod 158. The actuator rod 158 is routed through the shaft 112 to a lift mechanism (not shown). The lift mechanism may be actuated to move the rod 158 and lift plate 156 towards the carrier 116. The lift plate 156 contacts the pins 154 and causes the pins 154 to extend above the support surface 126 of the carrier 116, thus placing the substrate 104 in a spaced-apart relation relative to the carrier 116 that facilitates access to the substrate 104 by a substrate transfer device (not shown).

An annular retaining ring 130 is generally disposed on the flange 122 of the carrier 116. The retaining ring 130 generally snugly circumscribes and extends above a plane of the support surface 126. The thickness of the retaining ring 130 is configured so that a top surface 136 of the retaining ring 130 is substantially co-planar (i.e., within about ±1 mil) with the feature side 138 of the substrate 104 to be processed. The sidewalls 108 generally extend above the retaining ring 130 to define a processing area 150. The outlet 140 is typically located in the sidewall 108 near the elevation of the top surface 136 of the retaining ring 130 to allow the removal of electrolyte from the processing area 150 during or after processing.

The top surface 136 of the retaining ring 130 is typically fabricated from a material that does not adversely affect the polishing head 106 which may periodically contact the top surface 136. In one embodiment, the retaining ring 130 is fabricated from a material compatible with processing chemistries, for example, a thermoplastic such as polyphenylene sulfide (PPS) among other polymers. The retaining ring 130 may be grounded by the ground lead 144 that is routed out of the process cell 100 through the shaft 112. If the retaining ring 130 is a thermoplastic or other dielectric, there is no need to ground it since it is an electrical insulator.

Alternatively, the ring 130 may be metallic to promote uniformity across the wafer (particularly at the edge of the substrate). For example, an ungrounded copper retaining ring 130 may be used that has the same potential as the substrate during processing of the electrical field.

The polishing head 102 generally includes a pad 160, an optional zone control insert 165, an optional membrane 162, a support disk 164 and a counter-electrode 166 coupled to a housing 168. The pad 160 is generally exposed at the bottom of the polishing head 102 and contacts the substrate 104 and, in some embodiments, the retaining ring 130 during processing. The pad 160 may have one or more conductive elements formed therein. The membrane 162 is sandwiched between the pad 160 and the support disk 164. The counter-electrode 166 is disposed between the support disk 164 and the interior of the housing 168. The pad 160, membrane 162, disk 164 and the counter-electrode 166 are permeable, perforated, or contain passages formed therethrough that allow the electrolyte to flow into and out of the polishing head 102.

The polishing head 106 may be stationary or driven to provide at least a portion of the relative motion between the substrate 104 and the polishing head 106. In the embodiment depicted in FIG. 1A, the housing 168 is coupled to a drive system (not shown) by a column 170. The drive system moves the column 170 thereby providing the polishing head 106 with a rotary, orbital, sweep motion or a motion comprising combinations thereof, among other motions. The column 170 additionally provides a conduit for electrical leads and other control or supply lines to be routed into or out of the polishing head 106.

The housing 168 is generally fabricated from a rigid material compatible with process chemistries. The housing 168 generally includes a top 178 which is coupled to the column 170 and sides 180 extending therefrom. The sides 180 typically are coupled to the support disk 164, enclosing the counter-electrode 166 within the housing 168. A plurality of spacing members (not shown) generally extend from the top 178 into the interior of the housing 168. The spacing members keep the counter-electrode 166 in a spaced-apart relation relative to the top 178. The spacing members generally support the counter-electrode 166 in an orientation parallel to the surface of the substrate 104. The spacing members are configured to allow fluids to move laterally within the housing 168.

The counter-electrode 166 comprises an electrically conductive material. The counter-electrode 166 and the substrate 104 define a region between which an electrical bias (e.g. a potential difference) is established. The bias may be applied between the counter electrode 166 and the pad 160 that is placed in contact with the surface 138 of the substrate 104. The pad 160 may be at least partially conductive and may act as an electrode in combination with the substrate 104 during electrochemical processes, such as an electrochemical mechanical plating process (ECMPP), which includes electrochemical deposition and chemical mechanical polishing, or electrochemical dissolution. The counter-electrode 166 may be an anode or cathode depending upon the positive bias (anode) or negative bias (cathode) applied between the counter-electrode 166 and the pad 160.

For example, when depositing material from an electrolyte onto the substrate surface, the counter-electrode 166 acts as an anode and the substrate surface and/or conductive pad 160 acts as a cathode. A reaction takes place at the cathode causing material to deposit on the substrate surface. When removing material from a substrate surface, the counter-electrode 166 functions as a cathode and the substrate surface and/or the pad 160 acts as an anode. The removal may result from material on the substrate surface dissolving into the surrounding electrolyte due to the application of the electrical bias.

The level of the electrolyte within the basin 102 is maintained at a level that ensures that the counter-electrode 166 is immersed in the electrolyte during processing. The counter-electrode 166 is permeable to the electrolyte and gases, and can be a plate-like member, a plate having multiple holes formed therethrough or a plurality of counter-electrode pieces disposed in a permeable membrane or container.

The counter-electrode 166 typically is comprised of the material to be deposited or removed, such as copper, aluminum, gold, silver, tungsten and other materials which can be electrochemically deposited on the substrate 104. For electrochemical removal processes, such as anodic dissolution, the counter-electrode 166 may include a non-consumable electrode of a material other than the deposited material, such as platinum for copper dissolution. The non-consumable electrode is used in planarization processes combining both electrochemical deposition and removal.

Figure 2:
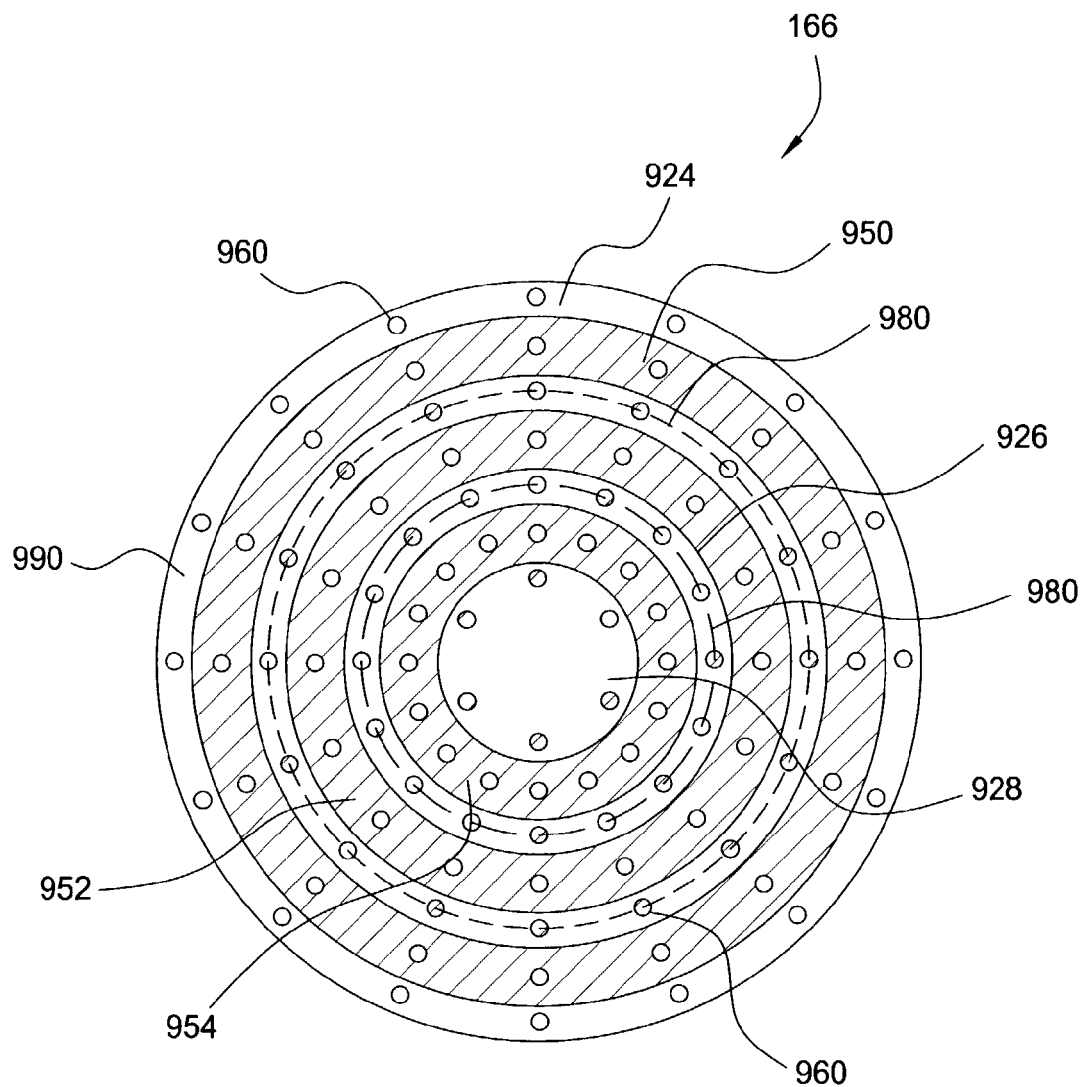
FIG. 2 is a bottom view of one embodiment of a counter-electrode.

FIG. 2 shows a bottom view of a counter-electrode 166 consistent with embodiments of the invention described herein. The counter-electrode has a surface 990 that generally is positioned to face the surface 138 of the material layer 105 to be polished. The counter-electrode 166 may be characterized as having a plurality of distinct zones. Three zones, an outer zone 924, an intermediate zone 926, and an inner zone 928 are shown by way of example in FIG. 2 (the zones 924, 926, 928 are separated by zone boundaries 980 that are shown in phantom in FIG. 2).

Each zone of the counter-electrode 166 generally comprises at least one conductive element (three conductive elements 950, 952, 954 are shown by way of example in FIG. 2) that is electrically isolated from the conductive elements in the other zones. Each conductive element may be, for example, a ring or a radially-oriented conductive element. Alternatively, other shapes and orientations, such as linear, curved, concentric, involute curves or other shapes and orientations are possible for the conductive elements. The conductive elements may be of substantially equal sizes and shapes from one zone to the next, or the sizes and shapes may vary depending upon the particular zone of concern. So that the zones may be separately biased, the conductive elements are separated by insulating material such as a solid, liquid, or gaseous (e.g. air) dielectric material, or combinations thereof. The counter electrode 166 may have perforations 960 therethrough to facilitate the flow of electrolyte through the counter-electrode 166.

The support disk 164 is perforated or permeable to the electrolyte and gases. The support disk 164 is made from a material compatible with the electrolyte that would not detrimentally affect polishing. The support disk 164 may be fabricated from a non-electrically conductive polymer, for example a plastic such as fluoropolymers, TEFLON® polymers, perfluoroalkoxy resin, PFA, polyethylene-based plastics, PE, sulfonated polyphenylether sulfones, PES, or other materials that are compatible or non-reactive with electrolyte compositions that may be used in electroplating or electropolishing. The support disk 164 is typically secured in the housing 168 of the polishing head 106 using adhesives, fasteners or other devices or methods that substantially ensure the parallelism of the support disk 164 and the carrier 116. The support disk 164 may be spaced from the counter-electrode 166 to provide a wider process window, thus reducing the sensitivity of depositing material and removing material from the substrate surface to the counter-electrode 166 dimensions.

In one embodiment, the support disk 164 includes a plurality of perforations or channels (not shown) formed therein. The size and density of the channels are selected to provide uniform distribution of the electrolyte through the support disk 164 to the substrate 104. In one aspect, the support disk 164 includes channels having a diameter between about 0.5 mm and about 10 millimeters. The channels may have a density between about 30% and about 80% of the polishing media. A channel density of about 50% has been observed to provide electrolyte flow with minimal detrimental effects to polishing processes. Generally, the channels of the support disk 164 and the pad 160 may be aligned to provide for sufficient mass flow of electrolyte through the support disk 164 and pad 160 to the substrate surface.

Figure 3:
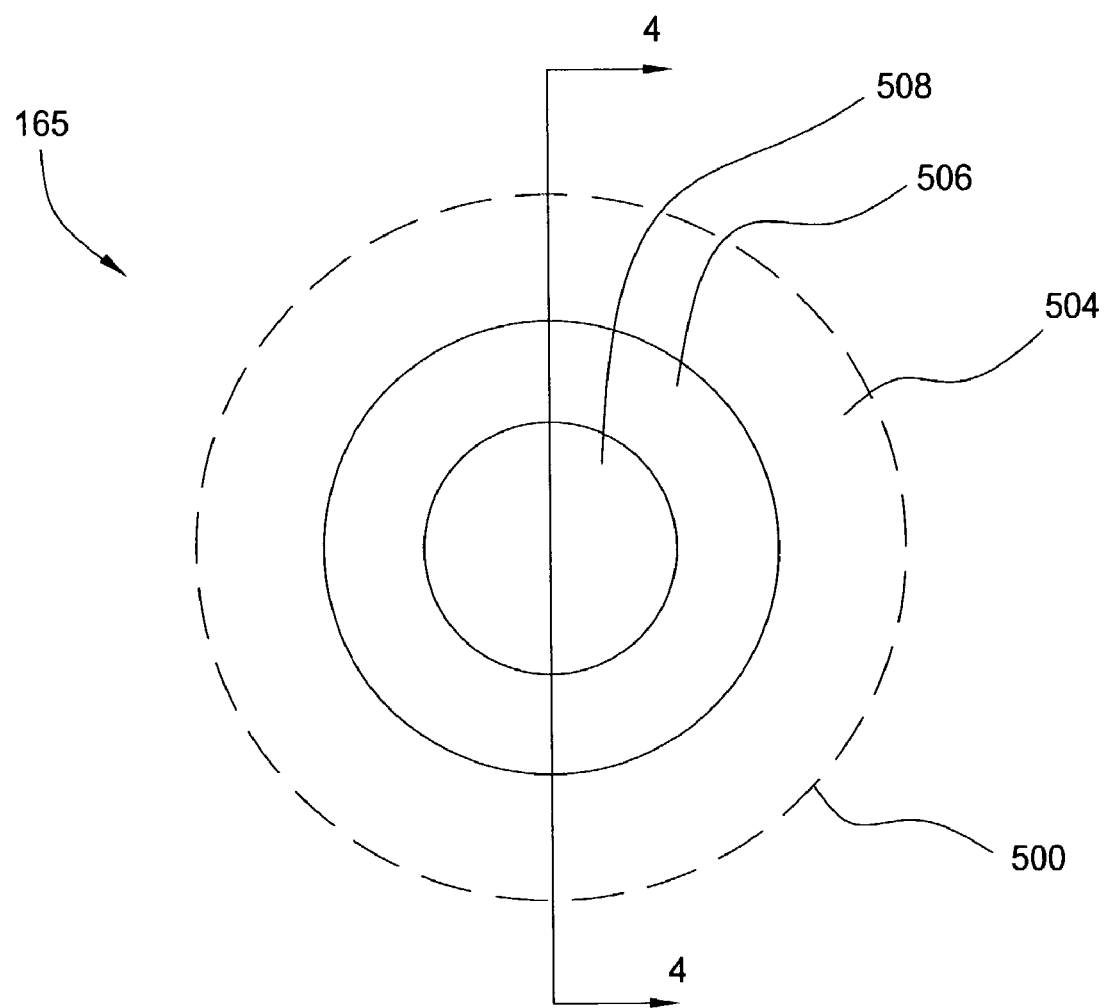
FIG. 3 is a bottom view of one embodiment of a dielectric insert.
Figure 4:
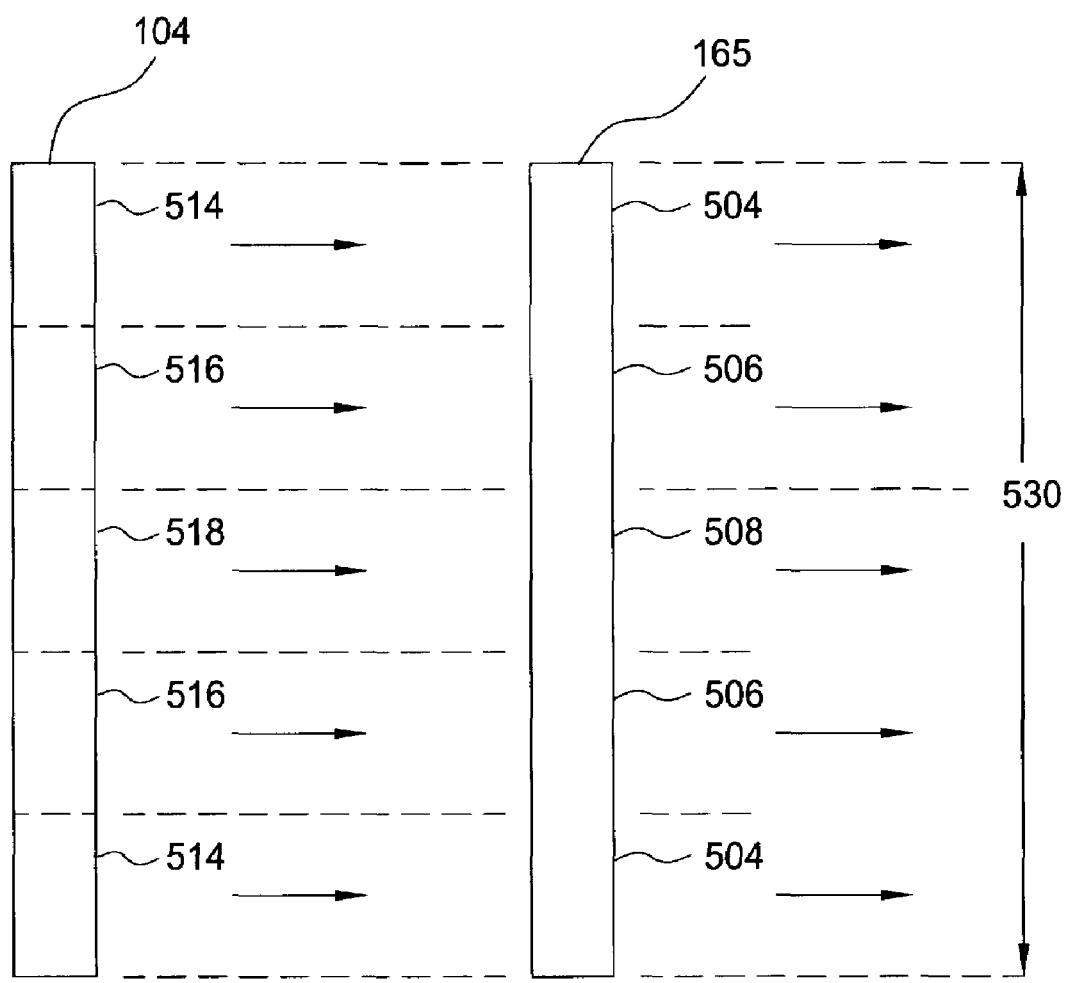
FIG. 4 is a schematic cross sectional view of the dielectric insert of FIG. 3 exposed to a flow of electrolyte.

A dielectric insert 165 may be positioned between the counter electrode 166 and the pad 160. FIG. 3 depicts a bottom view of one embodiment of the dielectric insert 165 and FIG. 4 depicts a cross sectional view of the dielectric insert 165 taken along line 4—4 of FIG. 3. While the following description of the dielectric insert is for a circular insert, the invention contemplates that the dielectric insert may have other shapes and geometrical configurations, such as a square shape.

Regarding FIG. 3, the dielectric insert 165 may have a circular outer surface or diameter 500 (shown in phantom). The diameter 500 may be greater or lesser than a diameter of the pad 160 disposed adjacent thereto. In one embodiment, the dielectric insert 165 has a diameter 500 generally corresponding to a diameter of the pad 160. An outer portion or zone 504 of the dielectric insert including the diameter 500 is exposed to and adapted to allow flow of electrolyte therethrough. The diameter 500 of the dielectric inset 165 may be less than the diameter or width of the portion of the apparatus disposed therein to allow electrolyte flow therearound from pad 160 to counter-electrode 166 or counter-electrode 166 to pad 160.

The dielectric insert 165 may also have a thickness (not shown to scale) necessary for use in inhibiting flow through the process cell 100. For example, the dielectric insert may have a thickness between about 0.1 mm and about 5 mm. Additionally, the thickness of portions of the dielectric insert 165 may vary across the dielectric insert 165. For example, the dielectric insert 165 may have a concave or convex shape for a desired removal profile or to mate with adjacent articles in the processing cell 100.

The dielectric insert 165 has a cross-sectional area that may modify or vary, i.e., impede or encourage, the flow of electrolyte between the pad 160 and the counter-electrode 166. For example, a dielectric insert may be adapted as a flow control insert and reduce or impede electrolyte flow through one or more portions of the dielectric insert 165 (arrows are used in FIG. 4 to indicate the direction of flow of electrolyte). The dielectric insert may also have an adaptable cross sectional area that by mechanical or other means controls the amount of electrolyte therethrough for different processes or different times during the same process.

In one aspect, the dielectric insert 165 may comprises a plurality of zones. The zones may be, for example, concentric circular or annular segments, as depicted in FIG. 2, or other geometrical configurations. For example, three zones, an outer zone 504, an intermediate zone 506, and an inner zone 508 are shown by way of example in FIGS. 3 and 4.

The insert 165 is adjustable such that each zone of the insert 165 may be switched between an open electrolyte flow state, such a full or 100% electrolyte flow, closed or blocked electrolyte flow state, such as about 0% electrolyte flow, or with the ability to have some electrolyte flow state or permeability between, such as 50% closed or blocked state, e.g., 50% electrolyte flow, therethrough. Greater than 50% electrolyte flow is considered a high electrolyte flow state or high permeability state, and 50% or less electrolyte flow is considered a low electrolyte flow state or low permeability state. For example, in FIG. 4, all zones are open and anodically dissolved material is allowed to flow freely from an outer zone 514, an intermediate zone 516, and an inner zone 518 of the substrate 104.

The state of each zone of the insert 165 may be adjusted between a blocked an open state by various ways. For example, the insert 165 may comprise a plurality of retractable, rotatable, or sliding plates that permit zones to be opened or closed. In another embodiment, the insert 165 comprises one or more detachable concentric rings that can be selectively removed or positioned so as to open or block a particular zone. Alternatively, the dielectric insert 165 may comprise a series of membranes that have an adjustable permeability to the electrolyte. In at least one embodiment the insert 165 is detachable from the polishing head 106 to facilitate adjustment of one or more zones from one state to another. While FIGS. 2–4 depict a zone in either one of two discrete states (i.e. blocked or open), it is within the scope of the invention for a zone to be switched between a plurality of partially blocked or partially permeable states as described above.

Limiting the electrolyte flow through the respective zone also correspond to a reduction in the current density therethrough. When the electrolyte is inhibited from flowing, such as by a low electrolyte flow state (low permeability state), the corresponding current density is reduced and any electrochemical activity, such as electroplating or electropolishing is reduced. In an open or high permeability state, the zone is occupied by either a material with low electrical resistance and/or high permeability to electrolyte or is unobstructed such that electrolyte may pass unimpeded and current density is higher than in zones with limited flow or limited current density.

The amount or thickness of dielectric material disposed in the respective zone of the dielectric insert 165 may also be increased to reduce the current density through the zone by an increase in electrical resistance between the counter-electrode 166 and the pad 160 or material layer 105. The dielectric insert 165 may also control the current density through one or more portions or zones by application of different dielectric materials for different portions or zones of the insert between the counter-electrode and pad or substrate in a similar manner as controlling the electrolyte flow therethrough.

The dielectric insert may comprise electrically resistive materials, such as a non-electrically conductive polymer, including, for example, a plastic such as fluoropolymers, TEFLON® polymers, perfluoroalkoxy resin, PFA, polyethylene-based plastics, PE, sulfonated polyphenylether sulfones, PES, or other materials that are compatible or non-reactive with electrolyte compositions that may be used in electroplating or electropolishing, such as dielectric materials used in conventional polishing pads, such as polyurethane. The dielectric insert 165 may comprise one or more materials dielectric to provide a desired dielectric of the entire dielectric insert or to provide the desired dielectric or electrical properties for each of the respective zones.

Figure 5:
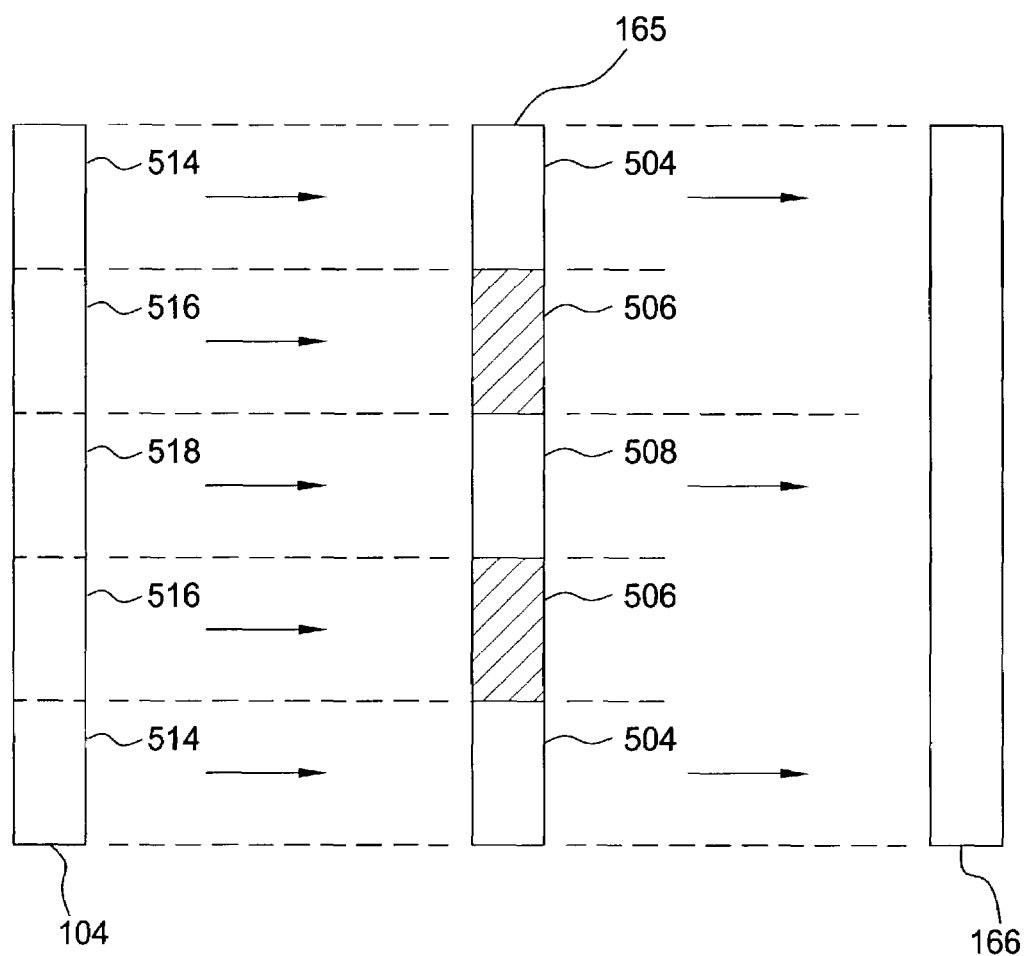
FIG. 5 is a schematic cross-sectional view of a dielectric insert depicting open and closed states of various zones.

FIG. 5 depicts the annular dielectric insert 165 that has an open or permeable inner zone 508 (e.g. an opening) that allows current/electrolyte such as, for example, anodically dissolved material from the inner zone 518 of the substrate 104 to pass from through the inner zone 508 of the insert 165. Similarly, the insert 165 has an open outer zone 504 that permits material from an outer zone 514 of the substrate 104 to pass through the outer zone 504 of the insert 165. The insert 165 has a blocked intermediate zone 506 that reduces or inhibits the current moving across an intermediate zone 516 of the substrate 104 through the intermediate zone 506 of the insert 165.

While FIGS. 4 and 5 depict an insert 165 that has a diameter 530 that is about the same size as a diameter of the substrate 104, the diameter of the insert 165 may be larger or smaller than the diameter of the substrate 104. In one embodiment, the insert 165 has a diameter that is about 3 to about 5 times larger than that of the substrate 104.

To facilitate control of polishing uniformity, a microprocessor controller 194, as shown in FIG. 1A may be electrically coupled to the optional dielectric insert 165 and the various components of the process cell 100 to facilitate control of the polishing process. The controller 196 comprises a central processing unit (CPU) 244, a memory 242, and support circuits 246 for the CPU 244. The CPU 244 may be one of any form of a general purpose computer processor that can be used in an industrial setting for controlling various process equipment and sub-processors. The memory 242 is coupled to the CPU 244. The memory 242, or computer-readable medium, may be one or more of readily available memory such as random access memory (RAM), read only memory (ROM), floppy disk, hard disk, or any other form of digital storage, local or remote. The support circuits 246 are coupled to the CPU 244 for supporting the processor in a conventional manner. These circuits include cache, power supplies, clock circuits, input/output circuitry and subsystems, and the like. A polishing process is generally stored in the memory 242 as a software routine. The software routine may also be stored and/or executed by a second CPU (not shown) that is remotely located from the hardware being controlled by the CPU 244.

The software routine is executed after the substrate is positioned in the process cell 100. The software routine when executed by the CPU 244, transforms the general purpose computer into a specific purpose computer (controller) 196 that controls the process cell 100 such that the polishing process is performed. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

The membrane 162 is generally permeable, thereby allowing the electric field lines, electrolyte and other liquids and gases to pass therethrough. The membrane 162 generally prevents particles or sludge released from the counter-electrode 166 from passing through the electrolyte and contacting the substrate 104. The membrane 162 is typically fabricated from a porous ceramic or polymer that is compatible with process chemistries and does not increase the cell resistance. For example, a spunbonded polyolefin (such as TYVEK®, available from E. I. DuPont de Nemours Inc. of Wilmington, Del.) may be used.

The pad 160 can be a pad, a web or a belt of material, which is compatible with the fluid environment and the processing specifications. In the embodiment depicted in FIG. 1A, the pad 160 is circular in form and is adhered or otherwise retained to the optional dielectric insert 165 or the membrane 162 at the bottom of the polishing head 106 opposite the housing 168 of the polishing head 106. The pad 160 may include one or more conductive elements (not shown in FIG. 1A) for contacting the feature side 135 of the substrate 104 during processing. A backing material (not shown) may be disposed between the membrane 162 and the pad 160 to tailor the compliance and/or durometer of the pad 160 during processing. Examples of a conductive pad that may be adapted to benefit from the invention are disclosed in U.S. patent application Ser. No. 10/033,732, filed Dec. 27, 2001, which paragraphs 41–157 are incorporated herein incorporated by reference to the extent not inconsistent with the claims aspects and description herein.

Figure 6:
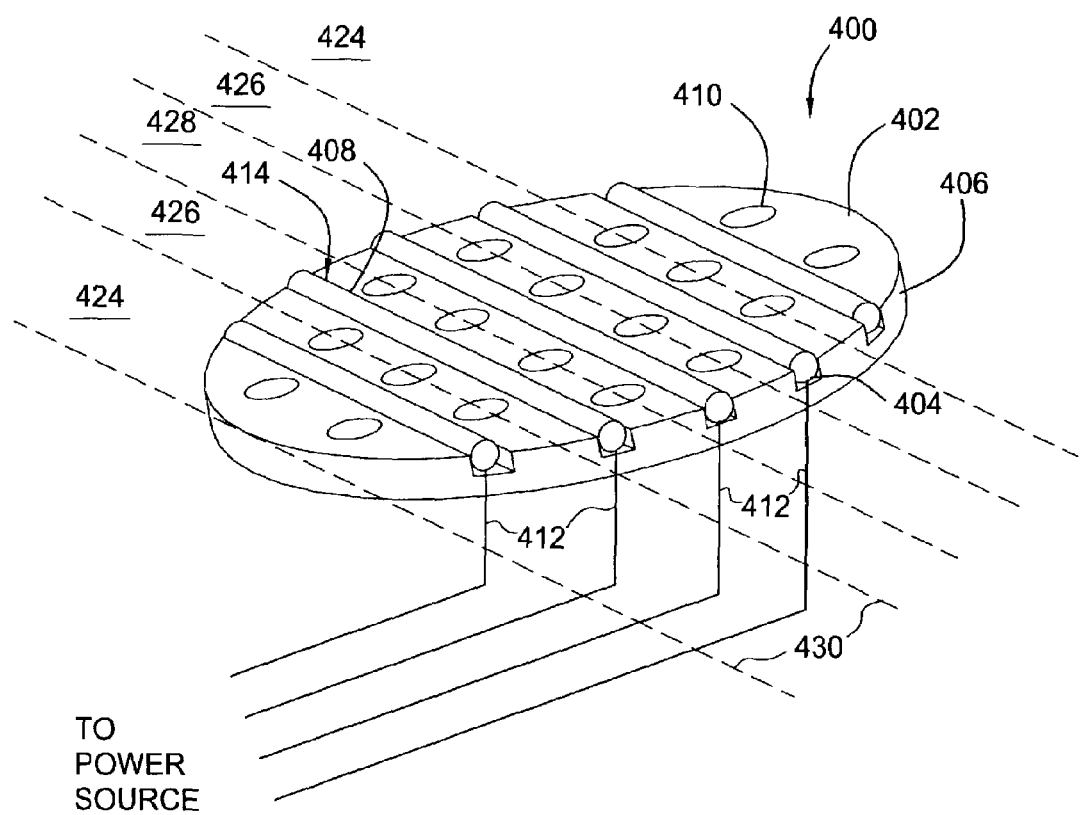
FIG. 6 is a bottom perspective view of one embodiment of a conductive pad that may be used to practice embodiments described herein.

FIG. 6 depicts a bottom perspective view of one embodiment of a pad that may be used to practice embodiments described herein. The pad 400 is a conductive pad comprising a body 406 having a polishing surface 402 adapted to contact the substrate while processing. The polishing surface 402 has a plurality of conductive elements 414, each of which may be formed within a pocket 404 within the polishing surface 402. The conductive elements 414 generally have a contact surface 408 that may extend above a plane defined by the polishing surface 402. The contact surface 408 is typically compliant to maximize electrical contact with the substrate without scratching. During polishing, the substrate generally provides a bias force that urges the contact surface 408 into a position co-planar with the polishing surface 402.

The body 406 is generally permeable to the electrolyte by a plurality of channels or perforations 410 formed therein. The plurality of perforations 410 allow electrolyte to flow through the body 406 and contact the surface of the substrate 104 during processing. Perforations 410 formed in the conductive pad 400 may include apertures, channels, or holes in the body 406. The aperture size and density is selected to provide uniform distribution of electrolyte, as well as current distribution, through the conductive pad 400 to a substrate surface.

The body 406 of the conductive pad 400 is generally made of a dielectric material. Examples of materials suitable for use in the body 406 include conventional polishing materials typically comprised of polymeric materials, such as polyurethane, polycarbonate, polyphenylene sulfide (PPS), or combinations thereof, and other polishing materials, such as ceramic material, used in polishing substrate surfaces. A conventional polishing media typically comprises polyurethane and/or polyurethane mixed with fillers. Conventional polishing media, such as the Freudenberg FX 9 pad is commercially available from Freudenberg & Company of Weinheim, Germany or the IC-1000 pad commercially available from Rodel Inc., of Phoenix, Ariz. Other conventional polishing materials, such as a layer of compressible material, for example felt leeched in urethane as in a Suba IV polishing pad commercially available from Rodel Inc., of Phoenix, Ariz., may also be utilized for the body 406.

The pockets 404 generally are configured to retain the conductive elements 414 while processing, and accordingly may vary in shape and orientation. In the embodiment depicted in FIG. 5, the pockets 404 are grooves of rectangular cross section and are disposed across the polishing surface 402 coupling two points on the perimeter of the conductive pad 160. Alternatively, the pockets 404 (and conductive elements 414 disposed therein) may be disposed at irregular intervals, be orientated radially, perpendicular and may additionally be linear, curved, concentric, involute curves or other orientation.

Typically, the conductive elements 414 may include conductive polymers, polymer composites with conductive materials, conductive metals or polymers, conductive fillers, graphitic materials, or conductive doping materials, or combinations thereof. The conductive elements 214 generally have a bulk resistivity or a bulk surface resistivity of about 10 Ω-cm or less.

The pad 400 may be characterized as having a plurality of distinct zones (three are shown, in phantom, by way of example in FIG. 5), such as an outer zone 424, an intermediate zone 426, and an inner zone 428. The zones 424 may have linear boundaries 430, as depicted in FIG. 5. Alternatively, the zones 424 may have radial boundaries 430, or boundaries 430 with other geometries.

One or more connectors 412 couple the conductive elements 414 to a power source 190 (or alternatively, a potentiostat) to electrically bias the conductive elements 414 while processing. The connectors 412 are generally wires, tapes or other conductors compatible with process fluids or having a covering or coating that protects the connector 412 from the process fluids. The connectors 412 may be coupled to the conductive elements 414 by soldering, stacking, brazing, clamping, crimping, riveting, fastening, conductive adhesive or by other methods or devices. Examples of materials that may be utilized in the connectors 412 include insulated copper, graphite, titanium, platinum, gold, and HASTELOY® among other materials. The connectors 412 may be coated with, for example, a polymer. In the embodiment depicted in FIG. 5, one connector 412 is coupled to each conductive element 414 at the perimeter of the conductive pad 400. Alternatively, the connectors 412 may be disposed through the body 406 of the conductive pad 400.

Figure 7:
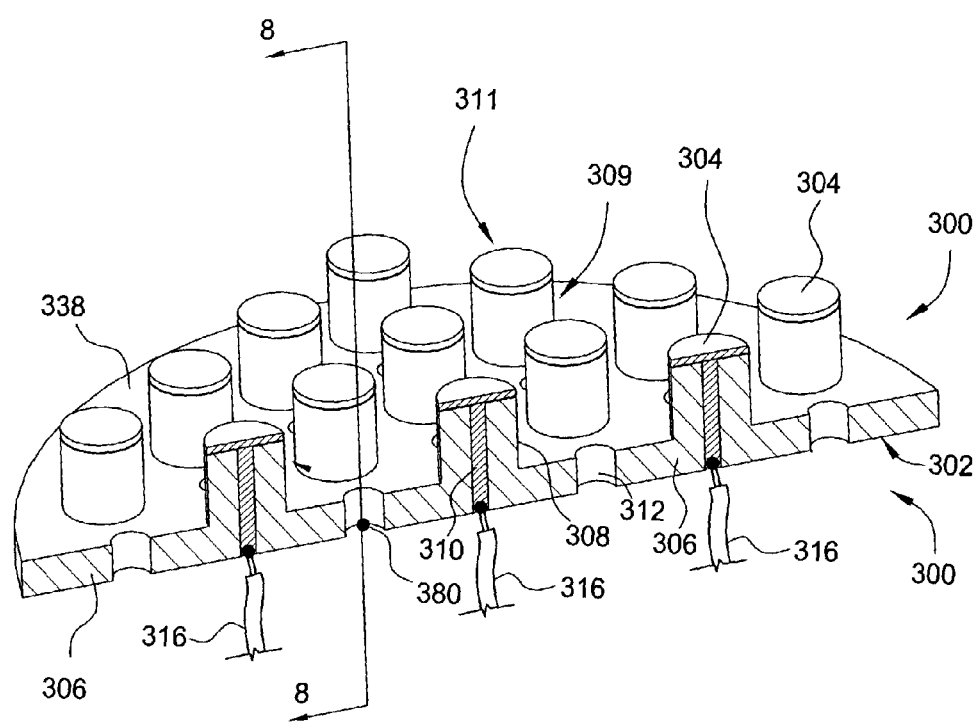
FIG. 7 is a bottom perspective view of a portion of another embodiment of a conductive pad that may be used to practice embodiments described herein.
Figure 8:
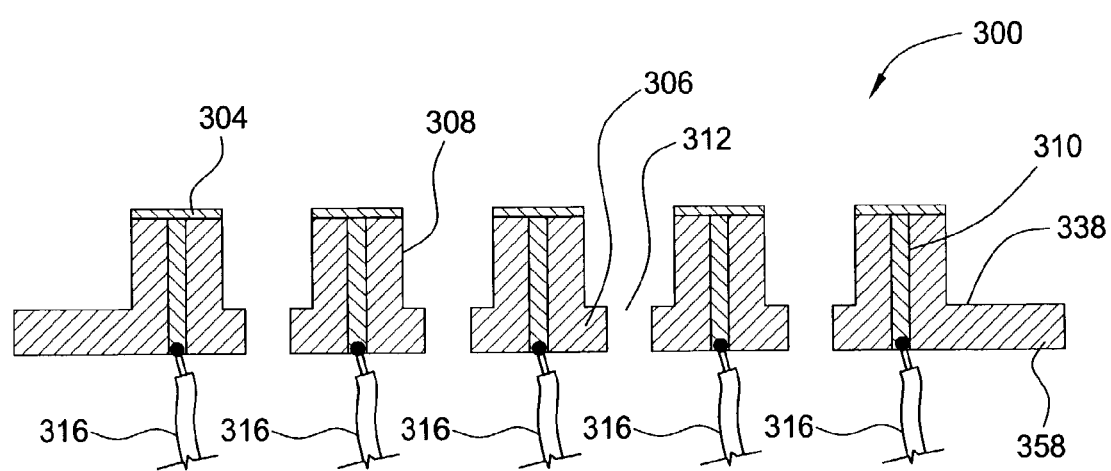
FIG. 8 is a cross-sectional view of the conductive pad of FIG. 7.

FIG. 7 depicts a three-dimensional bottom perspective view of another embodiment of a conductive pad 300 and FIG. 8 is a cross-sectional view of the pad 300 of FIG. 7 taken along line 8—8 of FIG. 7. The pad 300 includes a support 302 that comprises a perforated base 306. The perforated base 306 has a contact surface 338 and an opposing surface 358 opposed to the contact surface 338. The support 302 is generally constructed of a dielectric material similar to the dielectric materials described above for body 406 with reference to FIG. 5. Apertures or perforations 312 formed through the perforated base 306 allow fluid, such as electrolyte fluid, to pass through the pad 300.

The pad 300 may further include one or more reference electrodes disposed in a plurality of posts 308 extending from the surface 338 of the perforated base 306. The posts comprise a base portion 309 and a contact portion 311. A contact pad 304 comprising a conductive material is formed on the contact portion 311 of each post 308. The contact pads 304 may have an area that is substantially uniform amongst all of the contact pads 304 on the bottom surface 338 of the polishing pad 330. A conductive element 310, such as a wire or other conductive means, is formed through each post 308 to provide electrical contact with each contact pad 304 and one or more external power sources. Each wire 310 and contact pad 304 attached thereto form a continuous conductive pathway through pad 300. The plurality of posts 308 may be configured into a plurality of rings or are oriented radially, linearly, curved, concentrically, involuted, or combinations thereof.

The posts described are illustrative, and the invention contemplated posts of different geometries, such as square or conical bases, different heights, different thicknesses, and different numbers of conductive elements disposed therein.

The conductive pad 300 may further comprises a plurality of zones as discussed above with reference to FIG. 6 including one or more of the plurality of posts 308. The zones may contain the same or different number of posts, same or different density of posts, or the same or variable heights of the posts. The zones may further include posts 308 that do not have conductive elements or posts isolated from an electrical source. The configuration and number of posts in each zone may be varied or adapted to provide the desired amount of electrical bias for the individual post 308 in each zone or to provide a desired electrical bias for the entire zone.

The zones may be oriented radially from a center 380 of the conductive pad 300, (i.e., the zones may be defined as portions of the pad within a specific range of distance from the center 380 of the pad 300). The plurality of zones may also be configured into a plurality of rings or are oriented radially, linearly, curved, concentrically, involuted, or combinations thereof An electrical connector 316 may be attached to each conductive element 310 by, for example, soldering, to form an electrical connection thereto. Each zone generally includes at least one connector 316 electrically connected to the potentiostat or power supply 190.

Figure 9:
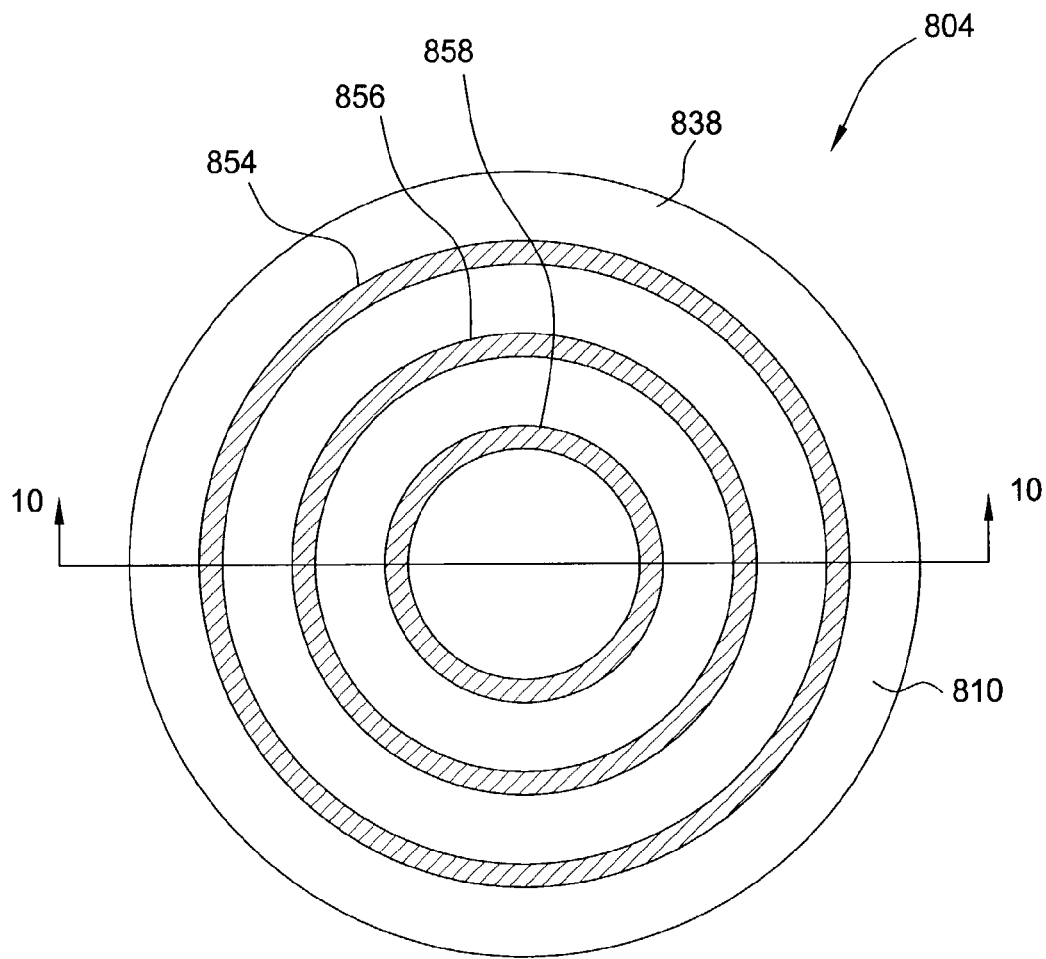
FIG. 9 is a bottom view of another embodiment of a conductive pad that may be used to practice embodiments described herein.
Figure 10:
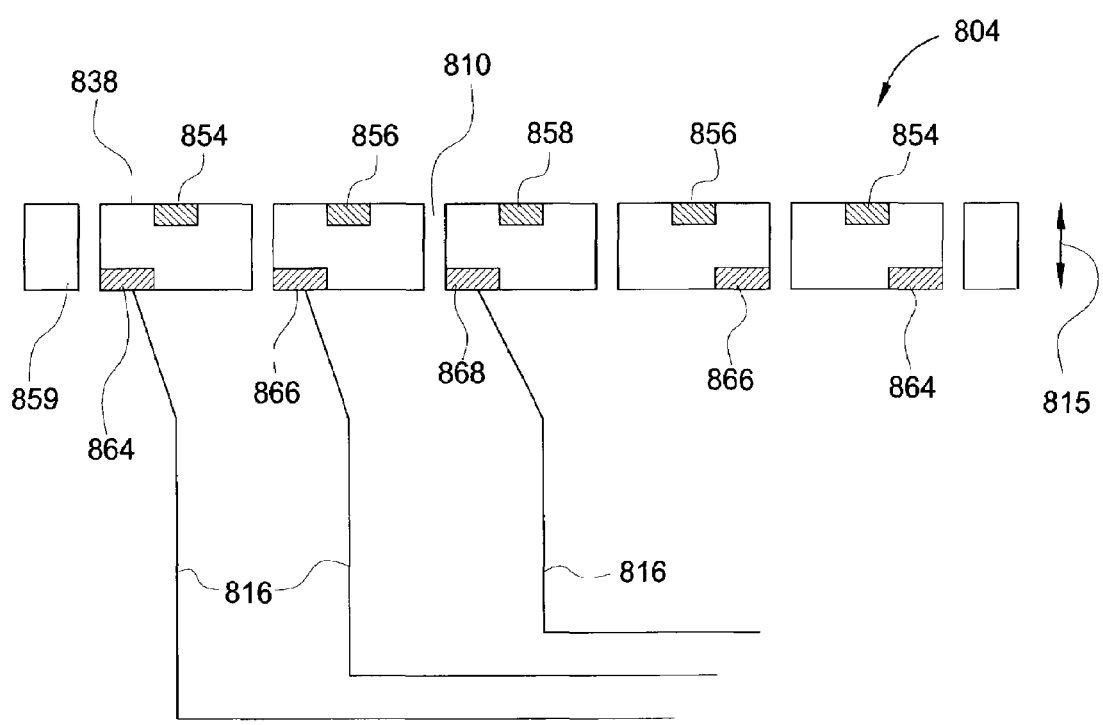
FIG. 10 is a cross-sectional view of the conductive pad of FIG. 9.

FIG. 9 depicts a bottom view of another embodiment of a conductive pad 804 having a contact surface 838 and an opposing surface 859. FIG. 10 depicts a cross sectional view of the conductive pad 804 of FIG. 9 taken through line 10—10. A plurality of contacting elements for contacting the substrate 104 may be formed in the pad 804. The contacting elements may be arranged in a pattern such as concentric circles, as shown in FIG. 9 and 10 (a first contacting element 854, a second contacting element 856 and a third contacting element 858 are shown by way of example in FIGS. 9 and 10) or in other configurations. The number of contacting elements is variable and may be selected to facilitate electrical contact between the pad 804 and the substrate 104.

A plurality of reference elements are also formed in the conductive pad 804 (a first reference element 864, a second reference element 866 and a third reference element 868 are shown by way of example in FIGS. 9 and 10). While FIGS. 9 and 10 depict contacting elements and reference elements arranged in similar patterns (i.e. concentric circles), the patterns may be dissimilar. The reference elements each comprise conductive material. Each reference element is generally separately connected by a connector 816 to the potentiostat 190 to facilitate the application of a separate bias in each zone and across a thickness 815 of the pad. Each reference element may be positioned proximate to a perforation 810 in the pad 804 to facilitate the flow of electrolyte and the establishment of the separate biases across the thickness 815 of the pad 804.

Furthermore, while FIG. 1A depicts the pad 160 as having a diameter larger than that of the substrate 104, the pad 160 may, alternatively, have a diameter smaller or substantially similar in size compared to the substrate 104. In one embodiment of the invention, the pad 160 and the counter-electrode 166 have a diameter that is in a range from about 3 to about 5 times as large as a diameter of the substrate 104 and the material layer 105 thereon.

While the polishing apparatus described above in FIG. 1A depicts a "face-up" polishing apparatus, it is also within the scope of the invention to use a face-down polishing apparatus in which a substrate is supported face down above a polishing pad.

Figure 1B:
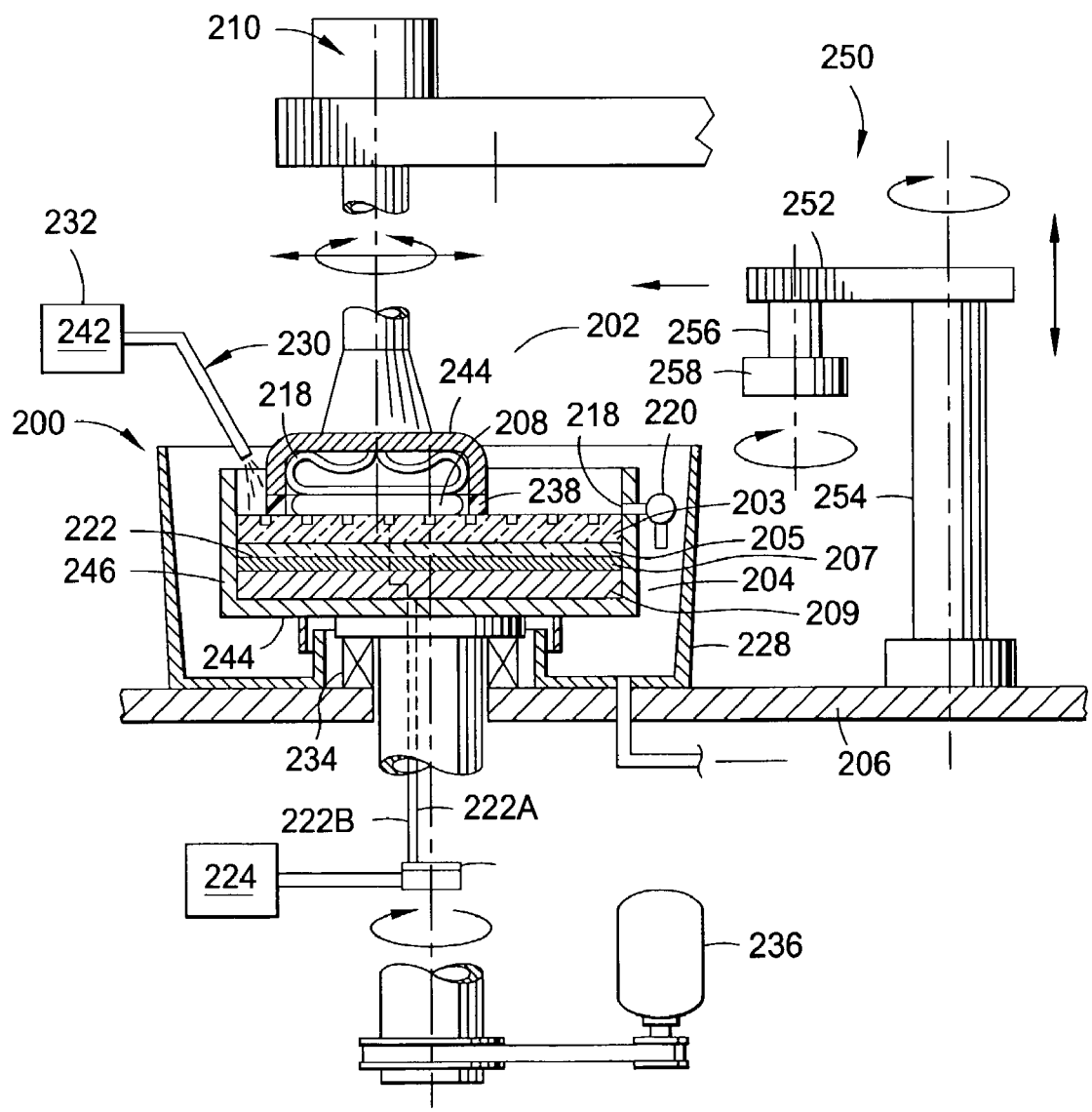
FIG. 1B is a sectional view of another embodiment of a processing cell that may be used to practice embodiments described herein.

FIG. 1B depicts a sectional view of one embodiment of a "facedown" process cell 200. The process cell 200 generally includes a basin 204 and a polishing head 202. A substrate 208 is retained in the polishing head 202 and lowered into the basin 204 during processing in a face-down (e.g., backside up) orientation. An electrolyte is flowed into the basin 204 and in contact with the substrate's surface while the polishing head 202 places the substrate 208 in contact with a pad assembly 222. The substrate 208 and the pad assembly 222 disposed in the basin 204 are moved relative to each other to provide a polishing motion (or motion that enhances plating uniformity). The polishing motion generally comprises at least one motion defined by an orbital, rotary, linear or curvilinear motion, or combinations thereof, among other motions. The polishing motion may be achieved by moving either or both of the polishing heads 202 and the basin 204. The polishing head 202 may be stationary or driven to provide at least a portion of the relative motion between the basin 204 and the substrate 208 held by the polishing head 202. In the embodiment depicted in FIG. 1B, the polishing head 202 is coupled to a drive system 210. The drive system 210 moves the polishing head 202 with at least a rotary, orbital, sweep motion or combinations thereof.

The polishing head 202 generally retains the substrate 208 during processing. In one embodiment, the polishing head 202 includes a housing 214 enclosing a bladder 216. The bladder 216 may be deflated when contacting the substrate to create a vacuum therebetween, thus securing the substrate to the polishing head 202. The bladder 216 may additionally be inflated to press the substrate in contact with the pad assembly 222 retained in the basin 204. A retaining ring 238 is coupled to the housing 214 and circumscribes the substrate 208 to prevent the substrate from slipping out from the polishing head 202 while processing. One polishing head that may be adapted to benefit from the invention is a TITAN HEAD™ carrier head available from Applied Materials, Inc., located in Santa Clara, Calif. Another example of a polishing head that may be adapted to benefit from the invention is described in U.S. Pat. No. 6,159,079, issued Dec. 12, 2001, which is hereby incorporated herein by reference in its entirety.

The basin 204 is generally fabricated from a plastic such as fluoropolymers, TEFLON® polymers, perfluoroalkoxy resin, PFA, polyethylene-based plastics, PE, sulfonated polyphenylether sulfones, PES, or other materials that are compatible or non-reactive with electrolyte compositions that may be used in electroplating or electropolishing. The basin 204 includes a bottom 244 and sidewalls 246 that define a container that houses the pad assembly 222.

The sidewalls 246 include a port 218 formed there through to allow removal of electrolyte from the basin 204. The port 218 is coupled to a valve 220 to selectively drain or retain the electrolyte in the basin 204.

The basin 204 is rotationally supported above a base 206 by bearings 234. A drive system 236 is coupled to the basin 204 and rotates the basin 204 during processing. A catch basin 228 is disposed on the base 206 and circumscribes the basin 204 to collect processing fluids, such as an electrolyte, that flow out of port 218 disposed through the basin 204 during and/or after processing.

An electrolyte delivery system 232 is generally disposed adjacent the basin 204. The electrolyte delivery system 232 includes a nozzle or outlet 230 coupled to an electrolyte source 242. The outlet 230 flows electrolyte or other processing fluid from the electrolyte source 242 to into the basin 204. During processing, the electrolyte generally provides an electrical path for biasing the substrate 208 and driving an electrochemical process to remove and/or deposit material on the substrate 208. Alternatively, the electrolyte delivery system may provide electrolyte through the bottom 244 of the process cell and flow electrolyte through the pad assembly, including the dielectric insert 207, to contact the polishing pad and substrate.

A conditioning device 250 may be provided proximate the basin 204 to periodically condition or regenerate the pad assembly 222. Typically, the conditioning device 250 includes an arm 252 coupled to a stanchion 254 that is adapted to position and sweep a conditioning element 258 across pad assembly 222. The conditioning element 258 is coupled to the arm 252 by a shaft 256 to allow clearance between the arm 252 and sidewalls 246 of the basin 204 while the conditioning element 258 is lowered to contact the pad assembly 222. The conditioning element 258 is typically a diamond or silicon carbide disk, which may be patterned to enhance working the surface of the pad assembly 222 into a predetermined surface condition/state that enhances process uniformity. One conditioning element 258 that may be adapted to benefit from the invention is described in U.S. patent application Ser. No. 09/676,280, filed Sep. 28, 2000 by Li et al., which is incorporated herein by reference to the extent not inconsistent with the claims aspects and description herein.

A power source 224 is coupled to the pad assembly 222 by electrical leads 212 (shown as 212A–B). The power source 224 applies an electrical bias to the pad assembly 222 to drive an electrochemical process as described further below. The leads 212 are routed through a slip ring 226 disposed below the basin 204. The slip ring 226 facilitates continuous electrical connection between the power source 224 and the pad assembly 222 as the basin 204 rotates. The leads 212 typically are wires, tapes or other conductors compatible with process fluids or having a covering or coating that protects the leads 212 from the process fluids. Examples of materials that may be utilized in the leads 212 include insulated copper, graphite, titanium, platinum, gold, and HASTELOY® among other materials. Coatings disposed around the leads 212 may include polymers such as fluorocarbons, PVC, polyamide, and the like.

As the pad assembly 222 includes elements comprising both an anode and cathode of an electrochemical cell, both the anode and cathode may be replaced simultaneously by simply removing a used pad assembly 222 from the basin 204 and inserting a new pad assembly 222 with fresh electrical components into the basin 204.

The pad assembly 222 depicted includes a conductive pad 203 coupled to a backing 207. The backing 207 may be coupled to an electrode 209. The dielectric insert 205 as described above may be disposed between the polishing pad 203 and the backing 207 or electrode 209. Typically, the conductive pad 203, the backing 207, optionally the dielectric insert 205, and the electrode 209 are secured together forming a unitary body that facilitates removal and replacement of the pad assembly 222 from the basin 204. Typically, the conductive pad 203, the backing 207, optionally the dielectric insert 205, and the electrode 209 are adhered or bonded to one another. Alternatively, the conductive pad 202, the backing 207, optionally the dielectric insert 205, and the electrode 209 may be coupled by other methods or combination thereof, including sewing, binding, heat staking, riveting, screwing and clamping among others.

The face-down polishing apparatus is more fully disclosed in U.S. patent application entitled "Method and Apparatus for Substrate Polishing," Ser. No. 10/151,538, filed May 16, 2002, commonly assigned and which paragraphs 25–81 are incorporated herein by reference to the extent not inconsistent with the claims aspects and description herein. Similarly to face-up polishing, relative motion is provided between the substrate and the electrode and/or pad.

Method of Polishing

Using embodiments described herein, the polishing uniformity of an ECMP process may be improved by selectively adjusting a current density between a substrate and specific zones of an electrode. Referring to FIGS. 1–5, the substrate 104 is transferred to the support surface 126 of the carrier 116 in a typical lift pin assisted transfer operation. The polishing head 106 is lowered into the basin 102 to place the substrate 104 in contact with the pad 160 or at least proximate thereto. Electrolyte is supplied to the basin 102 and to a level such that the electrolyte may contact the counter-electrode 166, the pad 160, and the optional insert 165. Alternatively, the substrate 104 is positioned in a face-down polishing apparatus such that the substrate 104 may contact the pad 106 disposed beneath the substrate 104.

The electrolyte used in processing the substrate 104 can include metals such as copper, aluminum, tungsten, gold, silver or other materials that can be electrochemically deposited onto or electrochemically removed from the substrate 104. Electrolyte solutions may include commercially available electrolytes. For example, in copper containing material removal, the electrolyte may include between about 2 and about 30% by volume or weight of sulfuric acid based electrolytes or phosphoric acid based electrolytes, such as potassium phosphate ($K_3PO_4$), phorphoric acid, or combinations thereof. Additionally, the invention contemplates using electrolyte compositions conventionally used in electroplating or electropolishing processes.

The electrolyte may comprise one or more chelating agents, one or more corrosion inhibitors, and one or more pH adjusting agents. The chelating agents may include one or more groups selected from the group consisting of amine groups, amide groups, carboxylate groups, dicarboxylate groups, tricarboxylate groups, and combinations thereof, for example, ethylenediamine. The chelating agents may be present in a concentration between about 0.1% and about 15% by volume or weight.

The one or more corrosion inhibitors may include an organic compound having azole groups, including benzotriazole, mercaptobenzotriazole, and 5-methyl-1-benzotriazole. The electrolyte composition may include between about 0.01% and about 2.0% by volume or weight of the organic compound having azole groups.

The pH adjusting agents that may be an acid, for example, acetic acid, citric acid, oxalic acid, phosphate-containing components, a base, such as potassium hydroxide (KOH), or combinations thereof, to provide a pH between about 3 and about 10. The electrolyte composition may include, for example, between about 0.2% and about 25% by volume or weight of the one or more pH adjusting agents. The composition may further comprise up to 15% one or more additives selected from the following group: suppressors, enhancers, levelers, inhibitors, brighteners, chelating agents, and stripping agents. An example of a suitable electrolyte is more fully described in U.S. patent application Ser. No. 10/032,275, filed Dec. 21, 2001, which paragraphs 14–40 are incorporated herein incorporated by reference to the extent not inconsistent with the claims aspects and description herein.

The electrolyte flow rate is typically constant, for example between about 0.1 gallons per minute (GPM) and about 20 GPM, but may vary according to the desires of the operator. Additionally, the invention contemplates that the electrolyte may be introduced from multiple inlets to provide variable electrolyte flow rates over portions of the substrate surface.

Power from the potentiostat or power source 190 may then be applied to the pad 160 and the counter-electrode 166 through leads 192, 199. One or more biases applied between pad 160 and the counter-electrode 166 result in the removal of conductive material, such as copper, disposed on the surface of the substrate 104, by an anodic dissolution method.

The substrate 104 and the pad 160 may be moved relative to one another to polish the surface 138 of the material layer 105 formed on the substrate 104. The relative motion is a polishing motion and may be applied before, after, or simultaneously with the application of the electrical bias. When contacting the surface of the substrate 104, the pad 160 typically applies a pressure of about 0.5 psi, preferably less than about 0.2 psi or less to the substrate surface.

In anodic dissolution, the bias may be applied to the counter-electrode 166, performing as a cathode, and the substrate 104 (as well as the conductive pad, for embodiments in which a conductive pad is used) performing as the anode. The application of the bias allows removal of deposited material from the substrate surface. The bias may include the application of a voltage of about 15 volts or less to a surface of the substrate 104. The bias may provide a current density between about 0.1 milliamps/cm$^2$ and about 50 milliamps/cm$^2$, or between about 0.1 amps to about 20 amps for a 200 mm substrate.

The bias applied to perform the anodic dissolution process may be varied in power and application depending on the user requirements in removing material from the substrate surface. For example, a time varying anodic potential may be provided to the pad 160. The pulses may have a pulse width in a range of about 0.1 seconds to about 20 seconds. The time-varying potential may range from about −10 volts to about 10 volts. By way of example, the pulses may be cycled between 0 volts and 3 volts. The pulses of anodic potential may be repeated for a number of cycles ranging, for example, from about 1 to about 100 cycles or more.

In one embodiment, the current density is spatially varied between the surface 138 of the material layer 105 to be polished and the counter-electrode 166. The current density is varied by varying the electrical resistance between the substrate 104 and the counter-electrode 166. The varying of electrical resistance may be effectuated by adjusting the flow or permeability of electrolyte between the substrate 104 and the counter-electrode 166. This adjustment in permeability translates into a change in current density because the rate of anodic dissolution from the substrate 104 and the current density between the counter-electrode 166 and the substrate 104 is directly related to the motion of charge carriers (e.g. copper ions) between the substrate 104 and the counter-electrode 166. By providing increased uniformity of permeability of electrolyte between the counter-electrode 166 and the substrate 104, the current density and the rate of material removal from the substrate 104 are thereby made more uniform across the substrate 104. Alternatively, electrical resistance may be varied across the surface 138 to be polished without varying the permeability of electrolyte between the counter-electrode 166 and the substrate 104.

The electrical resistance between the counter-electrode 166 and the substrate 104 may be adjusted using one or more inserts, such as the dielectric insert 165 discussed above with respect to FIGS. 3–5. The permeability of one or more zones of the dielectric insert 165 is adjusted to provide an increased uniformity in flow of electrolyte among all of the zones of the substrate 104. For example, in a first polishing period, the dielectric insert 165 is not inserted between counter-electrode 166 and the substrate 104. Alternatively, the dielectric insert 165 may be inserted, but all zones are open or unrestricted with respect to electrolyte flow. It may be observed, for example, that copper is being removed from an intermediate zone 516 of the substrate 104 at a faster rate than for other zones of the substrate 104. The flow control 165 is inserted between inserted between counter-electrode 166 and the substrate 104 or otherwise manipulated to decrease the permeability of the electrolyte through the intermediate zone 516 of the dielectric insert 154. This reduces the flow of electrolyte and the current density from the intermediate zone 516 of the substrate 104 through the intermediate zone 506 of the insert 165, thus making the rate of copper removal in the intermediate zone 516 closer to the rate of copper removal in the other zones.

While the above description details using the dielectric insert 165 to vary the flow rate of electrolyte, the dielectric insert 165 may deliver a variable current density through other mechanisms. For example, the dielectric insert 165 may have a dielectric material with a dielectric constant in one zone that differs from a dielectric material having a different dielectric constant of another zone, thereby resulting in varying current densities through the various zones of the insert 165. Additionally, the thickness of the dielectric material for the zone may also be used to adjust the dielectric constant of the material of the zone to control current density. Additionally, the shape of the zone may also be modified to control the electrolyte flow or current density passing therethrough.

The above description details one example of a non-uniformity pattern that is often observed in ECMP processes, in which an intermediate zone 516 exhibits a faster removal rate than for other zones. Other observed non-uniformity patterns may be corrected as well. For example, it may be observed that material is being removed faster in the outer zone 514 and the inner zone 518 with respect to the intermediate zone 516. In another non-uniformity pattern, the inner zone 518 may exhibit slower removal that either the intermediate zone 516 or the outer zone 514. Other non-uniformity patterns are possible as well. Any of these non-uniformity patterns may be corrected using the technique of adjusting the flow rate of electrolyte through the appropriate zones of the dielectric insert 165 to provide a removal profile to result in a planarized substrate surface.

In another embodiment of the invention, instead of using the optional dielectric insert 165 to control the flow rate of the electrolyte, the flow rate of electrolyte may be adjusted by altering a pattern of perforations such as the perforations 410 in the conductive pad 400. Specifically, the conductive pad 400 may have a plurality of perforations 410 formed therethrough, the perforations 410 located in one or more zones such as the zones 424, 426, 428 of the pad 400. The flow rate of electrolyte through, for example, the outer zone 424 of the pad 400 is altered by, for example, plugging or sealing one or more the perforations 410 in order to reduce flow in the outer zone 424. Plugging the perforations 410 may be accomplished by inserting, for example, plugs of dielectric material into the perforations 410. Alternatively, the flow rate of electrolyte may be altered through the zone 424 of the pad by adding one or more new perforations 410 through the pad 400 in the zone 424. The process of plugging or adding the perforations 410 may be repeated for other zones of the pad 400. By altering the number of the perforations 410 in, for example, the zone 424 of the pad 400, the flow rate through the zone 424 is altered, thereby altering the polishing rate of the pad 400 in the zone 424.

In another exemplary polishing process, current density between a substrate 104 and zones of an electrode is adjusted by applying a bias such as a potential difference between one zone of an electrode such as the counter-electrode 166 and the substrate 104. A second bias is independently applied between a second zone of the counter-electrode 166 and the substrate 104. The second bias may be unequal to the first bias. Additional zones, such as a third zone, a fourth zone, and the like, may also be independently biased.

Figure 11A:
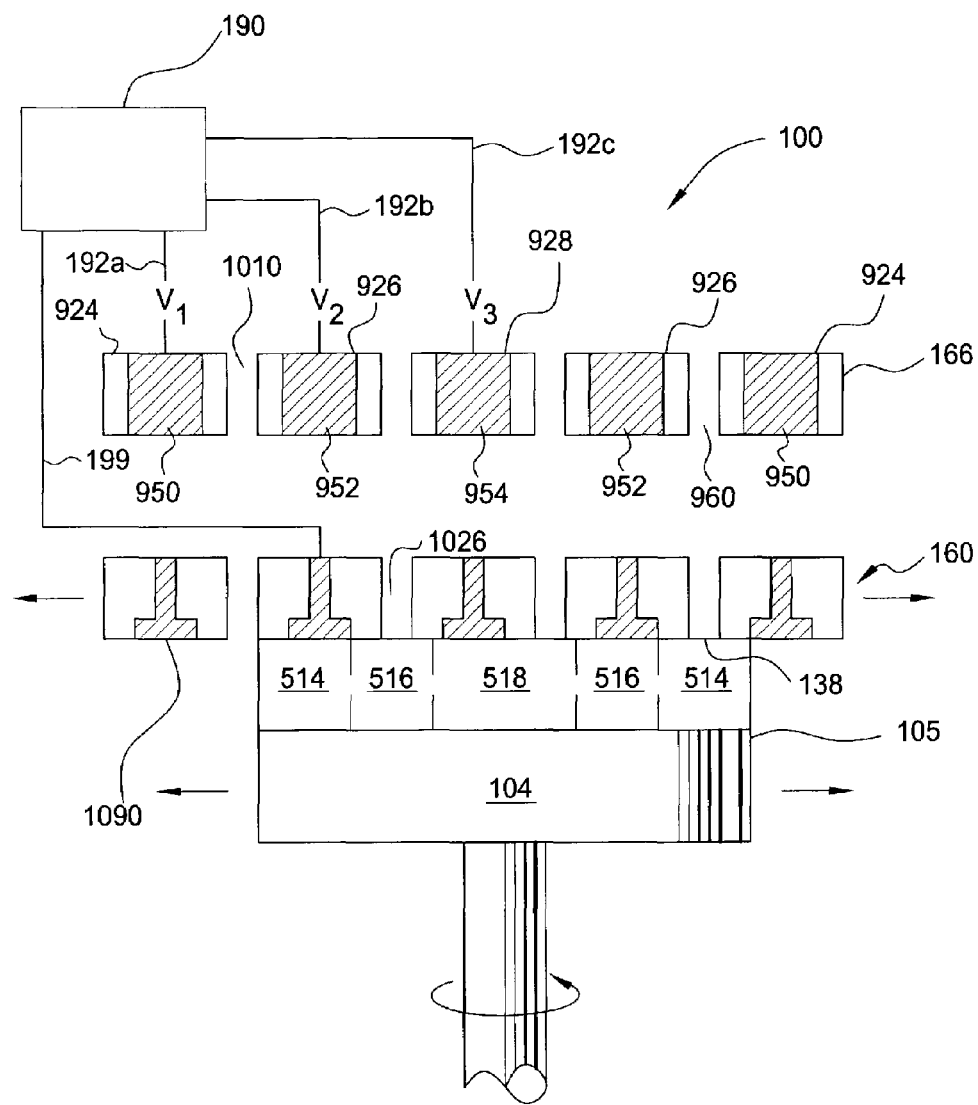
FIG. 11A–B are sectional views of embodiments of a processing cell of the present invention.

For example, referring to FIG. 11A, if it is observed that material from a copper layer is being removed (polished) faster in the intermediate zone 516 of the material layer 105 on the substrate 104 than the outer zone 514 and the inner zone 518, a first bias, V1 may be applied between an outer zone 514 of the substrate 104 and the counter electrode 166 using the power source or potentiostat 190. The bias may be applied, for example, using connectors 192a, 199 that provide the bias V1 between the first conductive element 850 formed in an outer zone 1014 of the counter-electrode 166 and, for example, a conductive element 1090 formed in the pad 160. A bias V2 of smaller magnitude than V1 may be separately applied between the second conductive element 852 in the intermediate zone 1016 of the counter-electrode 166 and the pad 160. A bias V3, applied to the third conductive element 854 in the inner zone 1018 may, for example, be set to a value similar to the bias applied between the outer zone 1014 and the material layer 105 to maintain a similar bias. Separate biasing of different zones of the counter-electrode 166 with respect to the substrate 104 allows one to correct a problem of unequal material removal rates that may have existed previously between the two zones of the substrate 104. The separate biases V1, V2, V3 may be applied simultaneously, or in a staggered, an overlapping, or a non-overlapping fashion, in time. Note that arrows in FIG. 11A depict linear, rotational, orbital, sweep, and other forms of relative motion that may be provided between the substrate 104 with respect to the counter-electrode 166 and the pad 160, for example, during the application of the biases V1, V2, and V3. To facilitate the application of the biases V1, V2, and V3, the pad 160 may have perforations 1026 to allow electrolyte to flow between the substrate 104 and the counter electrode 166.

Figure 11B:
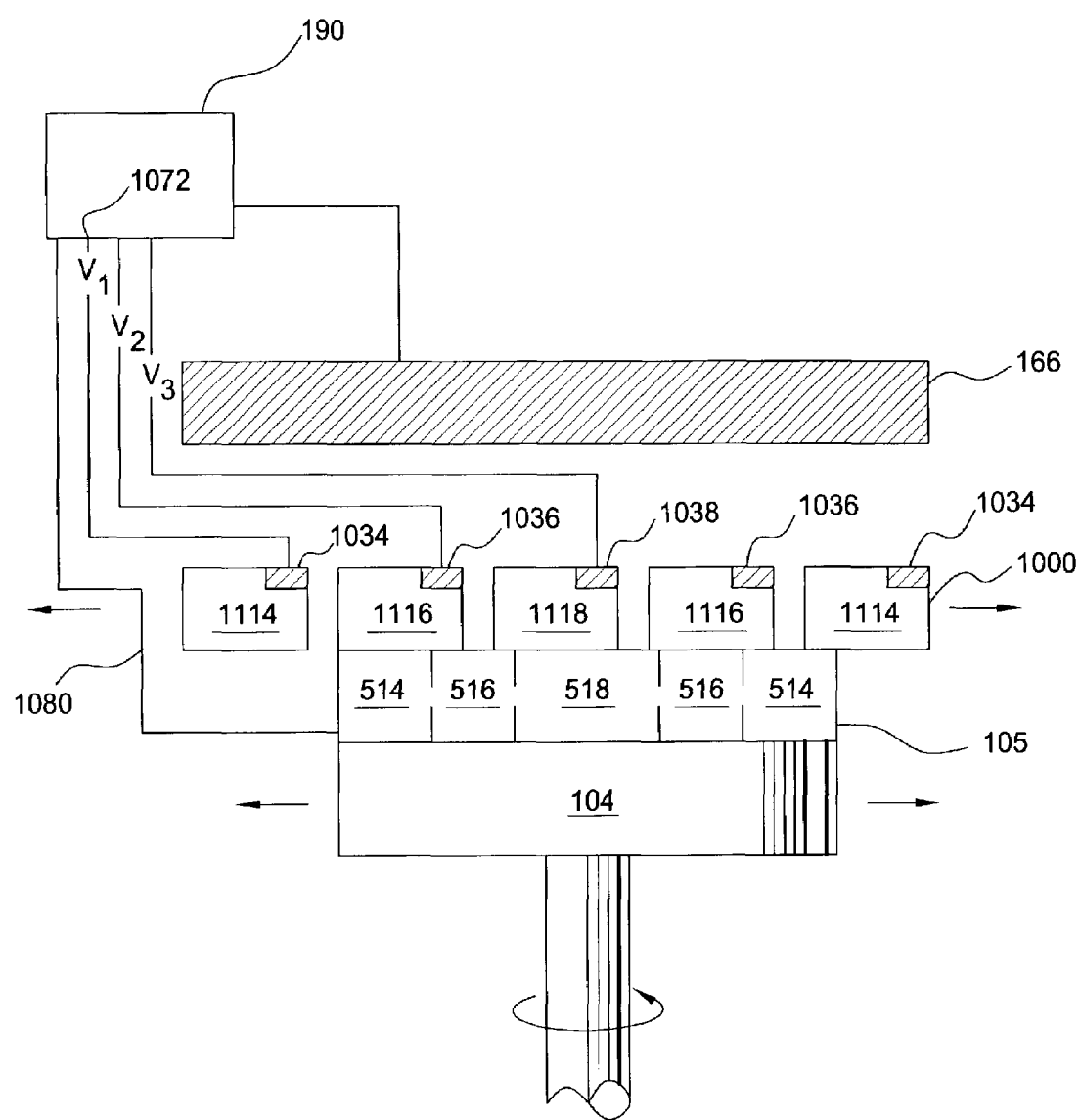

Referring to FIG. 11B, in another exemplary polishing process, the current density between a zone of the substrate and electrodes is adjusted in a similar manner as described above with reference to FIG. 11A. However, the potential differences are applied using a multiple electrode configuration. The multiple reference electrodes (three reference electrodes 1034, 1036, and 1038 are shown by way of example in FIG. 11B) may be, for example, formed within a conductive pad 1000. Alternatively, the reference electrodes may be spaced apart from the pad 1000. In this embodiment, the counter electrode 166 may be a continuous conductive material that is not separated into different zones by dielectric material, as depicted in FIG. 2.

For example, if it is observed that copper is being removed faster in the intermediate zone 516 than the outer zone 514 and the inner zone 518 of a substrate 104, a first bias, V1, may be applied between the substrate 104 and a first reference electrode 1034 in outer zone 1114 of the pad 1000. The potential difference V1 may be applied using the potentiostat 190. Electrical contact with the substrate 104 may be made, for example, using an electrical connector 1080 that is coupled to a contact ring or other device for contacting the substrate 104. The connector 1080 may alternatively be electrically coupled to the substrate 104 by one or more conductive elements, such as the contacting elements 854, 856, 858 in FIG. 6, that are formed within the pad 1000 and adapted to contact the substrate 104.

The first bias, V1, may be applied between the first reference electrode 1034 and the substrate 104, for example, using a connector 1072 that is connected between the potentiostat 190 and the first reference electrode 1034 within an outer zone 1114 of the pad 1000. A second bias, V2, may be separately applied between the substrate 104 and a second reference electrode 1036 in an intermediate zone 1116 of the pad 160. A third bias, V3, applied between the substrate 104 and a third reference electrode 1038 in an inner zone 1118 of the pad 160. The third bias, V3, may be similar in magnitude to V1 in order to maintain a similar potential between the outer zone 1114 and the inner zone 1118.

While the above detailed description makes reference to polishing the substrate 104 or the material layer 105 uniformly (i.e., provide a polishing rate that does not vary substantially across the surface to be polished), alternatively the biases may be applied to different zones of the counter-electrode 166 or the pad 160 so as to generate a removal rate or polishing rate that is non-uniform across the surface 138 to be polished. In this alternative embodiment, the biases may be applied, for example, in order to correct for a non-uniformity in thickness that may be present in the material layer 105 or substrate to be polished. In general, using embodiments of the invention, the polishing rate across the surface to be polished (i.e. the removal profile) may be controlled.

The separate biases to be applied to the zones of the counter-electrode 166, or alternatively to the multiple reference electrodes, may be determined empirically, i.e., by polishing a plurality of material layers 105 and adjusting the separate biases in order to make the polishing rate more uniform or to make the polishing rate match a pre-determined profile. Alternatively, the biases may be selected using an algorithm that determines the amount of time during a polishing process that various parts, points, or zones of the material layer 105 to be polished are associated with various zones of the pad 160. In this manner, removal rate from regions of the material layer may be optimized. Related co-pending U.S. Patent Application Ser. No. 11/048,117 "Process Control In Electrochemically Assisted Planarization", commonly assigned with the present invention and herein incorporated by reference to the extent not inconsistent with the claims aspects and description herein, provides details concerning methods used to calculate desirable biases to be applied to the counter-electrode 166, the pad 106 and the like.

While the insert 165 and the pad 160 described above are discussed in the context of an electrochemical-mechanical polishing (ECMP) process, the invention contemplates using the insert 165 and the pad 160 in other fabrication processes involving electrochemical activity. Examples of such processes using electrochemical activity include electrochemical deposition, which involves a pad 160 being used to apply bias to a substrate surface for depositing a conductive material, and electrochemical mechanical plating processes (ECMPP) that include a combination of electrochemical deposition and chemical mechanical polishing.

While the foregoing is directed to various embodiments of the invention, other and further embodiments of the invention may be devised without departing from the basic scope thereof, and the scope thereof is determined by the claims that follow.

What is claimed is:

1. An apparatus for processing a substrate, comprising:
   a substrate support;
   a counter-electrode;
   a pad positioned between the substrate support and the counter-electrode, wherein the pad comprises a surface for contacting the substrate; and
   a dielectric insert positioned between the counter-electrode and the pad, wherein the dielectric insert comprises a plurality of zones and at least one zone of the plurality of zones providing an adjustable current density between the counter-electrode and the substrate for the at least one zone of the plurality of zones, wherein the dielectric insert comprises two or more dielectric materials with each of the dielectric materials having a different dielectric constant, and at least one zone comprises a first dielectric material and at least a second zone comprises a second dielectric material different from the first dielectric material.

2. The apparatus of claim 1, wherein the dielectric insert modifies the permeability of an electrolyte in one or more of the plurality of zones.

3. The apparatus of claim 1, wherein the dielectric insert comprises one or more retractable, rotatable, slidable, or detachable plates or rings that define the one or more of the plurality of zones.

4. The apparatus of claim 1, wherein the dielectric insert comprises one or more concentric or annular rings.

5. The apparatus of claim 4, wherein the one or more concentric or annular rings are detachable from the dielectric insert.

6. The apparatus of claim 1, wherein each of the plurality of zones comprises an open electrolyte flow position, a blocked electrolyte flow position, or a position therebetween.

7. The apparatus of claim 1, wherein the dielectric insert comprises at least one electrically resistive polymeric material.

8. The apparatus of claim 1, wherein the dielectric insert has a diameter conforming to a diameter of the pad.

9. The apparatus of claim 1, wherein the dielectric insert comprises three concentric rings, wherein an outer ring has an outer diameter conforming to a diameter of the pad.

10. The apparatus of claim 1, wherein the dielectric insert comprises one or more membranes that have an adjustable permeability to electrolyte flow.

11. The apparatus of claim 1, wherein the counter-electrode comprises one or more electrically isolated conductive elements.

12. The apparatus of claim 11, Wherein the counter-electrode comprises one or more electrically isolated concentric or annular conductive elements.

13. The apparatus of claim 12, wherein the dielectric insert comprises one or more concentric or annular rings, the counter-electrode comprises one or more electrically isolated concentric or annular conductive elements, and each of the one or more concentric or annular rings of the dielectric insert correspond to each of the one or more electrically isolated concentric or annular conductive elements of the counter-electrode.

14. An apparatus for processing a substrate, comprising:
   a substrate support;
   a counter-electrode;

a pad positioned between the substrate support and the counter-electrode, wherein the pad comprises a surface for contacting the substrate; and a dielectric insert positioned between the counter-electrode and the pad, wherein the dielectric insert comprises a plurality of zones and at least one zone of the plurality of zones providing an adjustable current density between the counter-electrode and the substrate for the at least one zone of the plurality of zones, wherein the dielectric insert comprises two or more dielectric material thicknesses, and at least one zone comprises a first dielectric material thickness and at least a second zone comprises a second dielectric material thickness different from the first dielectric material thickness.

* * * * *

UNITED STATES PATENT AND TRADEMARK OFFICE
CERTIFICATE OF CORRECTION

PATENT NO. : 6,991,526 B2  Page 1 of 1
APPLICATION NO. : 10/224697
DATED : January 31, 2006
INVENTOR(S) : Lizhong Sun et al.

It is certified that error appears in the above-identified patent and that said Letters Patent is hereby corrected as shown below:

Column 1, Line 12: Change "claims" to --claimed--

Column 3, Line 4: After "apparatus", insert --is provided--

Column 12, Line 22: Delete "incorporated"

Column 12, Line 23: Change "claims" to --claimed--

Column 16, Line 29: Change "claims" to --claimed--

Column 17, Line 8: Change "claims" to --claimed--

Column 18, Line 1: Delete the second instance of "incorporated"

Column 18, Line 2: Change "claims" to --claimed--

Column 19, Line 15: Delete the second instance of "inserted between"

Column 19, Line 46: Change "that" to --than--

Column 21, Line 53: Change "claims" to --claimed--

Column 22, Claim 12, Line 55: Change "Wherein" to --wherein--

Signed and Sealed this

Twenty-ninth Day of August, 2006

JON W. DUDAS
*Director of the United States Patent and Trademark Office*